(12) United States Patent
Terada

(10) Patent No.: US 11,067,051 B2
(45) Date of Patent: Jul. 20, 2021

(54) IGNITION DEVICE OF INTERNAL COMBUSTION ENGINE

(71) Applicant: DENSO CORPORATION, Kariya (JP)

(72) Inventor: Kanechiyo Terada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/102,982

(22) Filed: Nov. 24, 2020

(65) Prior Publication Data

US 2021/0079880 A1 Mar. 18, 2021

Related U.S. Application Data

(63) Continuation of application No. PCT/JP2019/020568, filed on May 24, 2019.

(30) Foreign Application Priority Data

May 25, 2018 (JP) .............................. JP2018-100974

(51) Int. Cl.
*F02P 1/08* (2006.01)
*F02P 15/10* (2006.01)
*F02P 5/145* (2006.01)
*F02P 3/045* (2006.01)

(52) U.S. Cl.
CPC ............... *F02P 1/08* (2013.01); *F02P 3/0453* (2013.01); *F02P 5/145* (2013.01); *F02P 15/10* (2013.01)

(58) Field of Classification Search
CPC .... F02P 1/08; F02P 5/145; F02P 15/10; F02P 3/0453

USPC .................................. 123/406.12, 621, 622
See application file for complete search history.

(56) References Cited

U.S. PATENT DOCUMENTS

| | | | | |
|---|---|---|---|---|
| 4,361,129 A | * | 11/1982 | Sugie | ...................... F02P 7/035 |
| | | | | 123/622 |
| 9,932,954 B2 | * | 4/2018 | Nakamura | .............. F02P 9/007 |
| 2007/0267004 A1 | | 11/2007 | Yamauchi | |
| 2017/0022957 A1 | * | 1/2017 | Hayashi | .................. F02P 9/007 |
| 2017/0022960 A1 | | 1/2017 | Takeda et al. | |
| 2017/0030318 A1 | | 2/2017 | Nakamura et al. | |
| 2017/0045025 A1 | | 2/2017 | Nakayama et al. | |
| 2018/0195485 A1 | * | 7/2018 | Seimiya | .................. F02P 15/02 |

FOREIGN PATENT DOCUMENTS

| | | | | |
|---|---|---|---|---|
| EP | 2141352 A1 | * | 1/2010 | ............ F02P 3/0442 |
| JP | 2000-345950 | | 12/2000 | |
| WO | 2016/157541 | | 10/2016 | |

* cited by examiner

*Primary Examiner* — Mahmoud Gimie
(74) *Attorney, Agent, or Firm* — Nixon & Vanderhye P.C.

(57) ABSTRACT

An ignition control device is provided with an ignition coil including a primary coil and a secondary coil, a main ignition circuit performing a main ignition operation, an energy input circuit that performs an energy input operation for superposing a current having the same polarity to a secondary current, in which a signal generation circuit is provided to generate, based on a main ignition signal that controls the main ignition operation, at least one of an energy input signal controlling the energy input operation and a target secondary current command signal commanding a target secondary current value.

10 Claims, 12 Drawing Sheets

IGNITION DEVICE OF INTERNAL COMBUSTION ENGINE

This application is the U.S. bypass application of International Application No. PCT/JP2019/20568 filed May 24, 2019, which designated the U.S. and claims priority to Japanese Patent Application No. 2018-100974, filed May 25, 2018, the contents of which are incorporated herein by reference.

BACKGROUND

Technical Field

The present disclosure relates to an ignition device of an internal combustion engine.

Description of the Related Art

An ignition device in a spark-ignition type vehicle engine includes an ignition plug provided for each cylinder and an ignition coil composed of a primary coil and a secondary coil connected to the ignition plug. High voltage, which is produced in the secondary coil in response to cutting off of the power being applied to the primary coil, is applied to the ignition plug, thereby generating a spark discharge.

SUMMARY

One aspect of the present disclosure is an ignition device of an internal combustion engine including: an ignition coil that generates a discharge energy at a secondary coil connected to an ignition plug, the discharge energy being generated in response to a change in a primary current flowing through a primary coil; a main ignition circuit that controls an energization of the primary coil so as to produce a spark discharge at the ignition coil; an energy input circuit that performs an energy input operation for superposing a current having the same polarity to a secondary current flowing through the secondary coil; and a signal generation circuit that generates, based on a main ignition signal that controls the main ignition operation, at least one of an energy input signal controlling the energy input operation and a target secondary current command signal commanding a target secondary current value.

BRIEF DESCRIPTION OF THE DRAWINGS

The above-described object and other objects, features and advantages according to the present disclosure will be clarified by the detailed description below with reference to the accompanying drawings.

In the accompanying drawings.

DETAILED DESCRIPTION OF THE PREFERRED EMBODIMENTS

Figure 1:
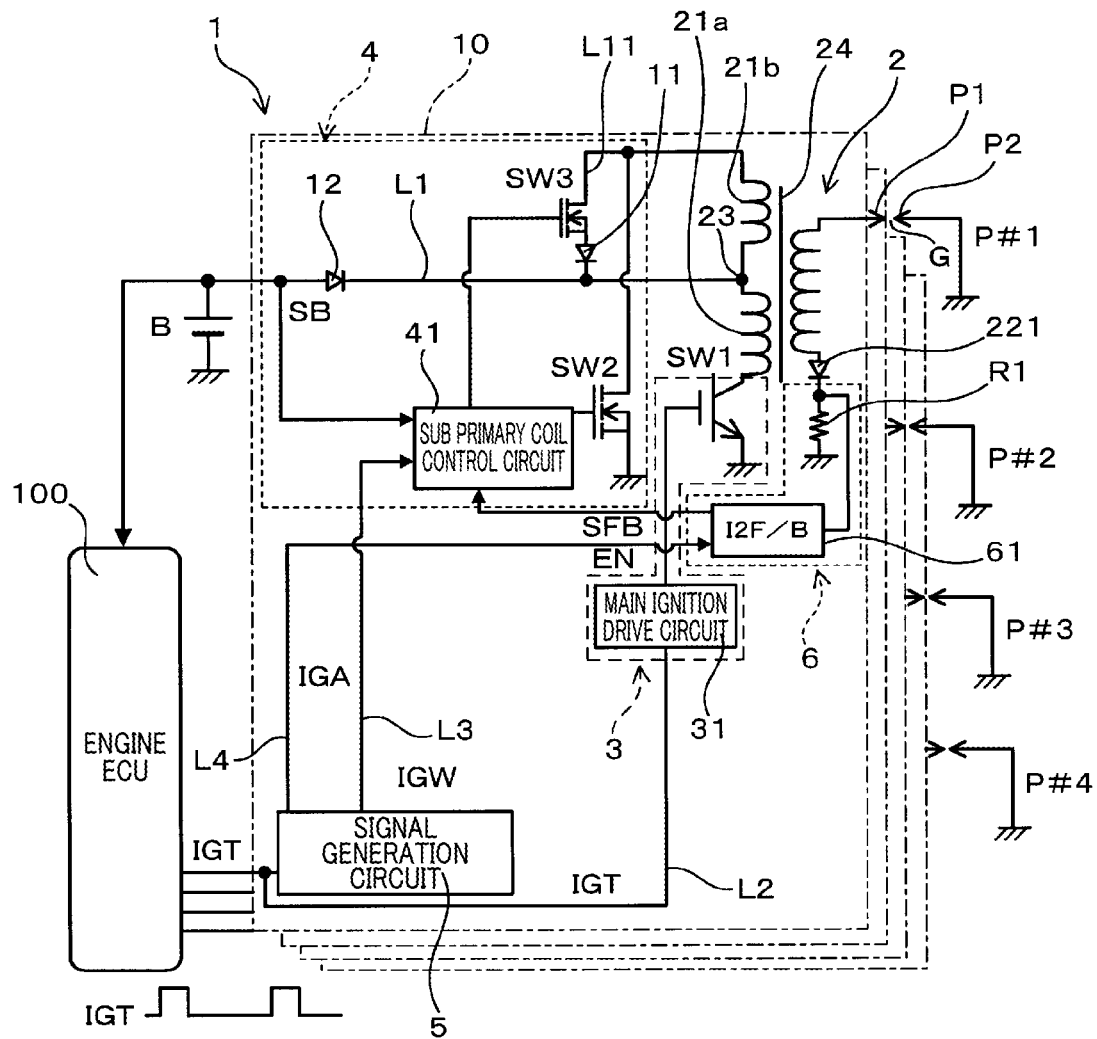
FIG. 1 is a circuit diagram showing an ignition control device to which an ignition device of an internal combustion engine is applied, according to a first embodiment.

An ignition device in a spark-ignition type vehicle engine includes an ignition plug provided for each cylinder and an ignition coil composed of a primary coil and a secondary coil connected to the ignition plug. High voltage, which is produced in the secondary coil in response to cutting off of the power being applied to the primary coil, is applied to the ignition plug, thereby generating a spark discharge. Moreover, in order to enhance an ignitability of the air-fuel mixture by the spark discharge, another ignition device is provided in which a means for applying discharge energy is provided to allow the spark discharge to be continuously performed after initiating the spark discharge.

In that case, it is possible to perform plural ignitions in which a single ignition coil repeatedly performs the ignition operation. However, in order to perform more stable ignition control, another ignition device is disclosed in which a discharge energy is added during a spark discharge generated by a main ignition operation, thereby increasing the secondary current by superposing them. For example, PTL1 proposes an ignition device in which an energy input device is provided to cause a secondary current to continuously flow in the same direction after the main ignition operation, thereby continuously performing the spark discharge, and the second current value during continuous discharge operation is controlled to enhance the energy efficiency.

As an example, Japanese Patent Application Laid-open Publication Number 2015-206355 discloses an ignition device, in which an engine control apparatus that controls an energy input quantity outputs a main ignition signal IGT and an energy input signal IGW via a signal line, and outputs a target secondary current command signal IGA via another signal line. Alternatively, a combined signal in which the energy input signal IGW and the target secondary current command signal IGA are combined is transmitted to the ignition device from the engine control device. The ignition device outputs extracts the energy input signal IGW from the transmitted combined signal IGWA, and outputs a command value of the secondary current based on the phase difference between the main ignition signal IGT and the combined signal IGWA.

According to the ignition device of the above-described patent literature, at least two signals (e.g. main ignition signal IGT and combined signal IGWA) are required to be transmitted from the engine control device in order to perform the main ignition and an energy input. In that case, when the number of signals increases, the number of signals each provided for respective engine control unit and the ignition device increases and the number of signals connecting between respective devices increases as well. Hence, as the number of cylinders increases, the system configuration becomes complexed such that space required for mounting the ignition device on the vehicle becomes larger. Accordingly, a problem arises that the system cost is significantly increased.

Also, a technique in which the main ignition signal IGT and the energy input signal IGW are combined to produce a single signal is known. However, the specification of the engine control unit needs to be changed in order to add the information of the energy input signal IGW to the output signal of the engine control unit. Alternatively, an ignition device is disclosed in which a plurality of spark discharges are produced by converting an ignition signal for one time ignition to ignition signals for a plurality of ignitions without changing the output signal from the engine control unit. However, since this device is configured to repeatedly turn the ignition switch to be ON and OFF in response to the potential of the capacitor charged with the ignition signal, it is difficult to apply to a device that continuously superposes the secondary current in the same direction immediately after the main ignition spark, and difficult to perform the feedback control using the target secondary current value.

Hereinafter, with reference to the drawings, embodiments of the present disclosure will be described.

First Embodiment

With reference to FIGS. 1 to 4, a first embodiment of an ignition device of an internal combustion engine will be described.

In FIG. 1, for example, the ignition device 10 is applied to an on-vehicle spark-ignition type engine and constitutes an ignition control device 1 that controls the ignition of an ignition plug P provided for each cylinder. The ignition control device 1 is provided with an ignition device 10 including an ignition coil 2, a main ignition circuit 3, an energy input circuit 4 and a signal generation circuit 5, and an engine electronic control unit 100 (hereinafter referred to as engine ECU) that applies an ignition command to the ignition device 10.

The ignition coil 2 produces a discharge energy at the secondary coil 22 connected to the ignition plug P in response to a change in the primary current I1 flowing through the primary coil 21. The main ignition circuit 3 controls energization of the primary coil 21 of the ignition coil 2 to perform a main ignition operation in which a spark discharge is produced at the ignition plug. The energy input circuit 4 performs an energy input operation that superposes current having the same polarity to the secondary current I2 flowing through the secondary coil 22 caused by the main ignition operation. The primary coil 21 includes, for example, a main primary coil 21a and a sub primary coil 21b. The energy input circuit 4 controls the energization of the sub primary coil 21b, thereby controlling the energy input operation.

The engine ECU 100 generates/transmits a main ignition signal IGT as a pulse signal at each combustion cycle. The signal generation circuit 5 is able to generate, based on waveform information of the main ignition signal IGT that controls the main ignition operation, at least either the energy input signal IGW that controls the energy input operation and the target secondary current command signal IGA indicating a target secondary current value I2 tgt. Preferably, both the energy input signal IGW and the target secondary current command signal IGA may be generated.

Figure 2:
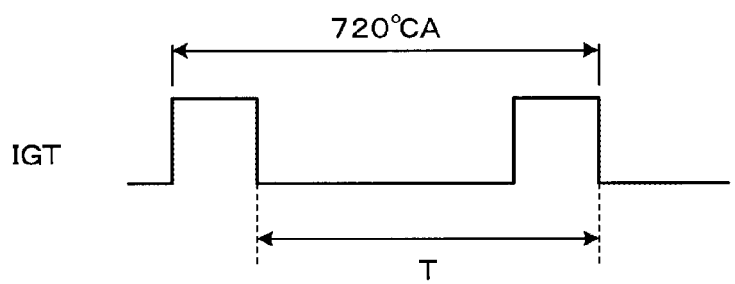
FIG. 2 is a waveform of a main ignition signal according to the first embodiment.

Specifically, as shown in FIG. 2, an engine operational region (e.g. engine speed region) can be determined by using information (e.g. signal period T) included in one or more pulse signals of the main ignition signal IGT transmitted at each one combustion signal (e.g. 720° C.A). Then, it is determined whether an energy input operation can be performed or not in accordance with the determination result, and when it is in a region for performing the energy input operation, either one or both of the energy input signal IGW and the target secondary current command signal IGA are generated corresponding to a region where the energy input operation is performed, whereby the energy input operation can be controlled.

As the information included in the pulse signal waveform, positions of a rising edge and a falling edge of the pulse signal or a pulse width thereof, and a signal period are used. Further, in addition to these information, positional relationship of the rising edge or the falling edge in two or more pulse signals and at least one of combinations of the positional relationship are used. Preferably, a measurement result of the signal period T expressed by falling edge interval corresponding to the ignition position of two main ignition signal IGT is utilized, whereby the engine speed region (described later) can be determined. As the signal period T, the falling edge signal which is the ignition position of the ignition plug P not the rising edge signal which is the energization start timing of the ignition coil 2, is utilized, whereby a period variation is reduced so that a detection accuracy can be secured.

The ignition device 10 operates the main ignition circuit 3 based on the main ignition signal IGT to perform the main ignition operation. Further, after performing the main ignition, the ignition device 10 operates the energy input circuit 4 based on the energy input signal IGW to perform the energy input operation, thereby continuing the spark discharge. The energy to be inputted during the continuous discharge is indicated by the target secondary command signal IGA. The ignition control unit 1 is provided with a feedback control unit 6 that performs a feedback control of the secondary current I2 based on the target secondary current command signal IGA such that the secondary current I2 flowing through the secondary coil 22 of the ignition coil becomes the target secondary current value I2 tgt.

Hereinafter, respective configurations of the ignition device 10 will be described in detail. The engine in which ignition device 10 according to the present embodiment is applied, is configured as a four cylinder engine, and provided with an ignition plug P (e.g. shown as P # 1-P # 4 in FIG. 1) for each cylinder and a ignition device 10 corresponding to each ignition plug P. In each ignition device 10, the main ignition signal IGT is transmitted to each ignition device 10 corresponding cylinder at a time corresponding to the ignition position of each cylinder from the engine ECU 100.

The ignition plug P has a publicly known configuration provided with a center electrode P1 and a ground electrode P2 facing each other in which a space formed between tip ends of both electrodes serves as a spark gap G. A discharge energy produced in the ignition coil 2 is supplied to the ignition plug P in accordance with the main ignition signal IGT, thereby producing spark discharge in the spark gap G. Hence, an ignition to the air-fuel mixture in the engine combustion chamber is accomplished. The energization to the ignition coil 2 is controlled in accordance with the energy input signal IGW and the target secondary current command signal IGA.

The ignition coil 2 constitutes a publicly known boost transformer in which a main primary coil 21a or a sub primary coil 21b as a primary coil and a secondary coil 22 are coupled to each other. One end of the secondary coil 22 is connected to the center electrode of the ignition plug P, and the other end is connected to the ground via a first diode 221 and a secondary current detecting resistor R1. The first diode 221 is disposed such that the anode terminal is connected to the secondary coil 22 and the cathode terminal is connected to the secondary current detecting resistor R1 so as to regulate the direction of the secondary current I2 flowing through the secondary coil 2. The secondary current detecting resistor R1 constitutes the feedback control unit 6 together with the secondary current feedback circuit 61 (e.g. shown as I2F/B in FIG. 1).

The main primary coil 21a and the sub primary coil 21b are connected in series and connected in parallel to the DC power source B such as vehicle battery. Specifically, an intermediate tap 23 is provided between one end of the main primary coil 21a and one end of the sub primary coil 21b. A power line L1 extending to the DC power source B is connected to the intermediate tap 23. The other end of the main primary coil 21a is connected to the ground via a switching element SW1 for main ignition (hereinafter referred to as main ignition switch), and the other end of the sub primary coil 21b is connected to the ground via a switching element SW2 for discharge continuation (hereinafter referred to as discharge continuation switch). Thus, the battery voltage can be applied to the main primary coil 21a or the sub primary coil 21b when the main ignition switch SW1 or the discharge continuation switch SW2 is ON-driven. The main ignition switch SW1 constitutes the main ignition circuit 3 and the discharge continuation switch SW2 constitutes the energy input circuit 4.

For example, the ignition coil 2 is configured to integrate the primary coil 21 and the secondary coil 22 which are wound around a primary coil bobbin and a secondary coil bobbin arranged around a core 24. At this time, the turn ratio between the number of turns of the main primary coil 21a or the sub primary coil 21b as the primary coil 21 and the number of turns of the secondary coil 22 is set to be sufficiently large, whereby a predetermined high voltage depending on the number of turns can be produced at the secondary coil 22. The main primary coil 21a and the sub primary coil 21b are wound around respective bobbins such that the directions in the magnetic flux produced when energized by the DC power source B are opposite to each other. The number of turns of the sub primary coil 21b is set to be smaller than the number of turns of the main primary coil 21a. Thus, after the voltage generated by cutting off the energization of the main primary coil 21a causes a discharge at the spark gap G of the ignition plug 2, a superposed magnetic flux in the same direction is produced by the energization of the sub primary coil 21b. Hence, the discharge energy can be increased by the superposition.

The main ignition circuit 3 is provided with a main ignition switch SW1, a switch drive circuit (hereinafter referred to as main ignition drive circuit) that drives the main ignition switch SW1 to be ON and OFF. The main ignition switch SW1 is configured as a voltage-drive type switching element, for example, IGBT (insulated gate bipolar transistor), in which the gate voltage is controlled depending on the drive signal inputted to the gate terminal, thereby controlling a path between the collector terminal and the emitter terminal to be conducted or cutoff. The collector terminal of the main ignition switch SW1 is connected to the other end of the main primary coil 21a and the emitter terminal thereof is connected to the ground.

The main ignition drive circuit 31 generates a drive signal corresponding to the main ignition signal IGT and drives the main ignition switch SW1 to be Ona and OFF. Specifically, (for example, see FIG. 5), in the case where the main ignition switch SW1 is controlled to be ON at a rising timing of the main ignition signal IGT, the main primary coil 21a is energized and the primary current I1 flows. Thereafter, in the case where the main ignition switch SW1 is controlled to be OFF at a falling timing of the main ignition signal IGT, the main primary coils 21a is cutoff and high voltage is produced at the secondary coil 22 by the mutual induction effect. The high voltage is applied to the spark gap G to generate a spark discharge and the secondary current U2 flows.

The energy input circuit 4 is configured to include a discharge continuation switch SW2, and a sub primary coil control circuit 41 that outputs a drive signal for switch-driving the discharge continuation switch SW2 and controls the sub primary coil 21b. Also, a switching element SW3 (hereinafter referred to as reflux switch) that opens and closes a reflux path L11 connected to the sub primary coil 21b is provided in which a drive signal from the sub primary coil control circuit 41 controls the switching element SW 3.

The discharge continuation switch SW2 and the reflux switch SW3 are each configured as a voltage-drive type switching element, for example, MOSFET (i.e. field effect transistor) in which the gate voltage is controlled depending on the drive signal which is inputted to the gate terminal, thereby conducting or cutting off a path between the drain terminal and the source terminal. The drain terminal of the discharge continuation switch SW2 is connected to the other end of the sub primary coil 21b and the source terminal is connected to the ground.

The reflux path L11 is provided between the other end of the sub primary coil 21b (i.e. opposite side of the main primary coil 21a) and the power source line. The drain terminal of the reflux switch SW3 is connected to the connection point between the other end of the sub primary coil 21b and the discharge continuation switch SW2, and the source terminal is connected to the power source line L1 via the second diode 11. Further, the third diode 12 is provided on the power source line L1 between the connection point at the reflux path L11 and the DC power source B. For the second diode 11, the forward direction is a direction towards the power source line L1. For the third diode 12, the forward direction is a direction towards the primary coil 21. Thus, the reflux switch SW3 is controlled to be ON during the discharge continuation switch SW2 being OFF, whereby the other end of the sub primary coil 21b and the power source line L1 are connected via the reflux path L11. Therefore, since reflux current flows when the power to the primary coil 21b is cutoff and the current of the sub primary coil 21b gradually changes, the secondary current I2 can be prevented from being rapidly decreased.

For the main ignition drive circuit 31, the main ignition signal IGT outputted by the signal generation circuit 5 is inputted to main ignition drive circuit 31 via the output signal line L2. Moreover, for the sub primary coil control circuit 41, the energy input signal IGW outputted from the signal generation circuit 5 and the target secondary current command signal IGA are inputted to the sub primary coil control circuit 41 via the output signal lines L3 to L4. For the sub primary coil control circuit 41, a feedback signal SFB is inputted to the sub primary coil control circuit 41 from the secondary current feedback circuit 61 of the feedback control unit 6, and a battery voltage signal SB is inputted to the sub primary coil control circuit 41 from the power source line L1, and which are used for determining whether the energy input operation should be performed.

The output signal line L4 of the target secondary current command signal IGA is connected to the input terminal of the secondary current feedback circuit 61. The secondary current feedback circuit 61 compares the target secondary current command signal IGA as an input with a detection value of the secondary current I2 based on the secondary current detection resistor R1, and outputs the result to the sub primary coil control circuit 41. Specifically, the detected secondary current I2 is determined with a threshold based on the target secondary current value I2 tgt indicated by the target secondary current command signal IGA and outputs a feedback signal SFB which feedbacks to the open/close driving of the discharge continuation switch SW2.

The sub primary coil control circuit 41 determines whether an energy input operation can be performed or not in accordance with combinations of inputted signal from respective circuits. For example, a drive signal is generated at a predetermined timing, based on the energy input signal IGW and other energy input conditions (e.g. feedback control based on the feedback signal SBO, battery voltage signal SB and the like), to drive the discharge continuation switch SW2 and the reflux switch SW3 to be ON and OFF. Further, a delay time Td or the like is set in order to activate the energy input operation at the predetermined timing after the main ignition operation.

Specifically, (for example, see FIG. 5), the energy input signal IGW rises subsequently to the falling edge of the main ignition signal IGT, whereby the energy input period is indicated and the drive signal of the discharge continuation switch SW2 is outputted after elapsing a predetermined delay time Td, and then the energy input operation is performed. Also, the feedback control that maintains the target secondary current value is performed based on the feedback signal SFB, while the energy input operation is being performed.

For the secondary current feedback circuit 61 in order to perform a feedback control of the secondary current I2 with such a target secondary current command signal IGA, for example, a circuit configuration disclosed by Japanese Patent Application Laid-Open Publication No. 2015-200300 can be employed. Specifically, the secondary current feedback control circuit 61 is provided with a comparator that compares the detected secondary current I2 with the threshold, and a switching means for switching thresholds. The comparator utilizes the target secondary current command signal IGA to be the reference voltage of the comparator, and either upper threshold or lower threshold relative to the reference voltage is appropriately selected and inputted thereto. The comparator outputs, as a feedback signal SFB, the result of the comparison with the detection signal which is voltage-converted with the secondary detection resistor R1. For example, the upper threshold and the lower threshold are set with respect to the target secondary current I2tgt as the center value, where the upper threshold is selected when the secondary current I2 increases during the discharge continuation switch SW2 being ON and the lower threshold is selected when the secondary current I2 decreases during the discharge continuation switch SW2 being OFF. As will be described later, in the case where a plurality of target secondary current values I2 tgt indicated by the target secondary current command signal IGA are selected, in response to this, the upper threshold and the lower threshold are each changed.

In this respect, in the sub primary coil control circuit 41, for example, an AND circuit is provided to which the energy input signal IGW and the feedback signal SFB as a second current comparison result are inputted, in order to drive the discharge continuation switch SW2. The feedback signal SFB is low when the detection signal is larger than the upper threshold, and is high when the detection signal is smaller than the lower limit. In other words, while the energy input signal IGW is active, when the secondary current I2 is below the lower threshold, the discharge continuation switch SW2 turns ON, and when the secondary current I2 exceeds the upper threshold, the discharge continuation switch SW2 turns OFF, thereby performing the energy input operation.

Next, with reference to FIGS. 3 and 4, the signal generation circuit 5 will be described in detail.

Figure 3:
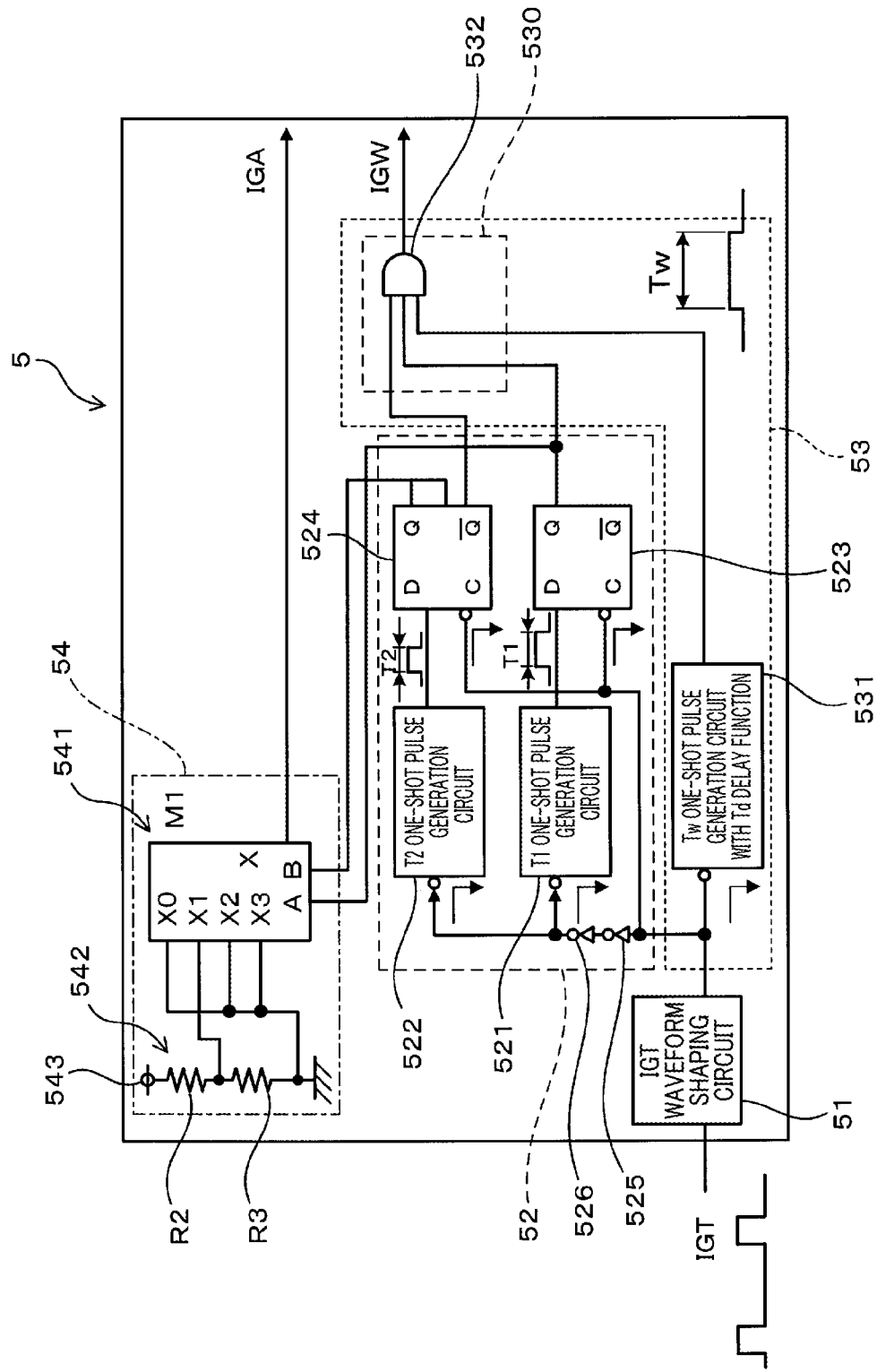
FIG. 3 is a circuit diagram showing a signal generation circuit that constitutes the ignition device according to the first embodiment.
Figure 4:
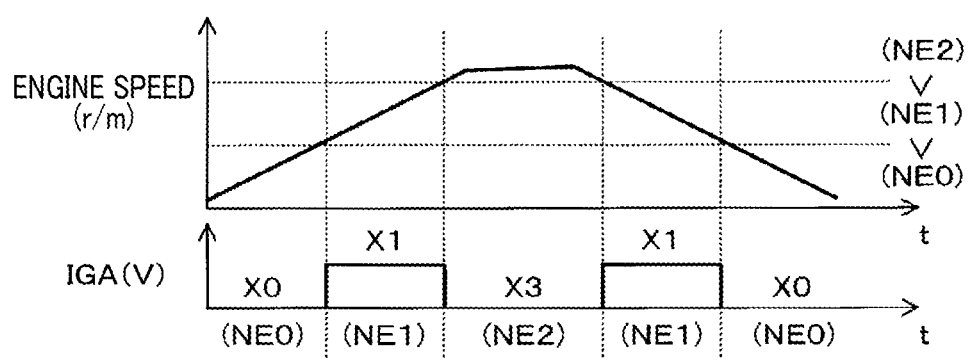
FIG. 4 is a diagram showing a relationship between a speed region determined by an IGA generation unit of the ignition device and a target secondary current command signal IGA according to the first embodiment.

In FIG. 3, the signal generation circuit 5 is provided with an IGT waveform shaping circuit 51, a speed region determination unit 52 that determines an engine speed region (i.e. operation region determination unit that determines an operation region of an internal combustion engine), an IGW generation unit 53 that generates an energy input signal IGW, and an IGA generation unit 54 that generates a target secondary current command signal IGA. For the main ignition signal IGT inputted to the signal generation circuit 5, firstly, a filtering process is applied at the IGT waveform shaping circuit 51, the signal to which the filtering process is applied as the pulsed main ignition signal IGT, is transmitted to the speed region determination unit 52 and the IGW generation unit 53.

According to the present embodiment, in order to determine whether an energy input operation can be performed from the engine operation region, the speed region determination unit 52 is provided to determine the current engine speed region, based on the main ignition signal IGT after waveform shaping is completed. The IGW generation unit 53 outputs, based on the output from speed region determination unit 52, the energy input signal IGW when determined that the current speed region is a region for performing the energy input operation. The IGA generation unit 54 generates the target secondary current command signal IGA based on the output from the speed region determination unit 52.

The IGW generation unit 53 is provided with a Tw one-shot pulse generation circuit 531 with a Td delay function, a first AND gate 532 as an IGW output circuit 530. The input terminal of the Tw one-shot pulse generation circuit 531 with Td delay function is connected to the output terminal of the IGT waveform shaping circuit 51. The Tw one-shot pulse generation circuit 531 with Td delay function generates an one-shot pulse signal (hereinafter referred to as Tw pulse) having a certain pulse width Tw. The Tw one-shot pulse generation circuit 531 is triggered by a falling edge of the main ignition signal IGT and outputs the one-shot pulse signal delayed by a delay time Td as a one time output. The pulse width Tw is set to be a predetermined period (i.e. energy input period) capable of being used as an energy input signal IGW. The delay time Td is set to be a period from a rising edge of the IGT signal to a time at which the discharge is expected to be activated at the spark gap G of the ignition plug P, and the current caused by the energy input is superposed to the secondary current I2. The first AND gate 532 generates the energy input signal IGW based on a logical AND between the output of the speed region determination unit 52 and the output of the Tw one-shot pulse generation circuit 531 with a Td delay function.

The speed region determination unit 52 is composed of a T1 one-shot pulse generation circuit 521 and a T2 one-shot pulse generation circuit 522, a first D flip-flop 523 and a second D flip-flop 524, and a first inverter 525 and a second inverter 526. The output terminal of the IGT waveform shaping circuit 51 is connected in parallel to the input terminals of the T1 one-shot pulse generation circuit 521 and the T2 one-shot pulse generation circuit 522 via the first inverter 521 and the second inverter 526. Further, the output terminal of the IGT waveform shaping circuit 51 is connected in parallel to the clock terminal (hereinafter referred to as C terminal) of the first D flip-flop 523 and the second D flip-flop 524.

The first inverter 252 and the second inverter 526 are two inverter gate circuits connected in series and delays the waveform-shaped main ignition signal IGT. The delayed main ignition signal IGT is transmitted to the T1 one-shot pulse generation circuit 521 and the T2 one-shot pulse generation circuit 522. The output terminal of the T1-one-shot pulse generation circuit 521 is connected to the data terminal (hereinafter referred to as D terminal) of the first D flip-flop 523, and the output terminal of the T2-one-shot pulse generation circuit 522 is connected to the D terminal of the second D flip-flop 524. For the input signals of the first D flip-flop 523 and the second D flip-flop 524, due to the propagation delay of the first inverter 525 and the second inverter 526, the signals inputted to the D terminals are delayed relative to the main ignition signal IGT inputted to the C terminals. Thus, the output signals of the first D flip-flop 523 and the second D flip-flop 524 become latched signals where the output levels of the T1 one-shot pulse generation circuit 521 and the T2 one-shot pulse generation circuit 522, which are triggered by the falling edge of the previous IGT signal, are latched.

The T1 one-shot pulse generation circuit 521 is triggered by the falling edge of the main ignition signal IGT to generate an one-shot pulse signal (hereinafter referred to as T1 pulse) having a certain pulse width T1, and outputs for only one time. Similarly, the T2 one-shot pulse generation circuit 522 is triggered by the falling edge of the main ignition signal IGT to generate an one-shot pulse signal (hereinafter referred to as T2 pulse) having a certain pulse width T2, and outputs for only one time. Each pulse width T1 and T2 is a certain period for a threshold to determine whether an energy input operation can be performed or not, and is set in advance to be a signal period T at which the falling edge of the main ignition signal IGT occurs corresponding to a predetermined engine speed. Here, the pulse width T1 is longer than the pulse width T2 (i.e. T1>T2). Since the signal interval T becomes longer as the engine speed approaches low speed region, and becomes shorter as the engine speed approaches the high speed region, either pulse width T1 or T2 corresponding to the upper and lower limits of the engine speed region is selected for performing the energy input operation, thereby determining whether it is in a predetermined engine speed region.

For the first AND gate 532, the output terminal (hereinafter referred to as Q terminal) of the first D flip-flip 523 and the output terminal (hereinafter referred to as Q bar terminal) of the second D flip-flop 524 are connected. Hence, at the falling edge of the main ignition signal IGT, the output of the first AND gate 532 becomes High level in the case where the output of the Tw one-shot pulse generation circuit 531 having Td function is High, the output of the Q terminal of the first D flip-flop 523 is High and the output of the Q bar terminal of the second D flip-flop 524 is High. When the output of Tw one-shot pulse generation circuit 531 having Td delay function becomes Low, the output of the first AND gate 532 becomes Low. In other words, an energy input signal IGW is generated indicating the energy input period.

The output of the Tw one-shot pulse generation circuit 531 having Td delay function and the outputs of the Q terminals of the first D flip-flop 523 and the second D flip-flop 524 are set such that the initial value at the power ON is Low. These outputs may be set such that a clear pulse having short duration from an end edge of the Tw one-shot pulse or an end edge of T1 one-shot pulse is generated to ensure Low level at the end point of the energy input signal IGW. Thus, the next operation for the main ignition signal IGT can be correctly performed and the signal level can be initialized to Low level when the engine is stopped so that re-start operation can be performed appropriately.

The IGA generation unit 54 is provided with a target secondary current setting circuit 541 that generates the target secondary current command signal IGA and a first voltage divider 542. The target secondary current setting circuit 541 includes a first multiplexer M1 in which the Q terminal of the first D flip-flop and the Q terminal of the second D flip-flop are connected to the A terminal and the B termina of the first multiplexer M1 respectively. The first multiplexer M1 selects one of four input terminals X0 to X3 depending on the combination of logic (A:B) of the A terminal and B terminal and outputs the selected input voltage signal (X0 to X3) from the X terminal as the target secondary current command signal IGA. Note that a relationship between (A:B) and (X0 to X) is as follows.

(A:B)=(0:0):X0
(A:B)=(1:0):X1
(A:B)=(0:1):X2
(A:B)=(1:1):X3

The first voltage divider 542 divides the voltage of the first voltage source 543 with two resistors R2 and R3 to generate the reference voltage X1 which is outputted to the X1 terminal of the first multiplexer M1. Other terminals such as X0 terminal and X2, X3 terminals are connected to the ground. At this time, a relationship between a trend of the engine speed and the target secondary current command signal IGA is shown in FIG. 4. The target secondary current value I2tgt corresponding to the reference voltage signal X1 is set during the speed region NE1 where (A:B)=(0:0), thereby starting the energy input operation. In the speed region NE0 of low speed side where (A:B)=(0:0), or the speed region NE1 of high speed side where (A:B)=(1:0), the target secondary current value I2tgt is set to be 0 mA, and the energy input operation is not performed. Thus, three speed regions NE0 to NE2 (NE0<NE1<NE2; unit r/m) can be selected. Note that since the relationship between the pulse widths T1 and T2 inputted to the first D flip-flop 523 and the second D flip-flop 524 is T1>T2 as described above, a condition of (A:B)=(0:1) is not met and X2 is not substantially selected.

Figure 5:
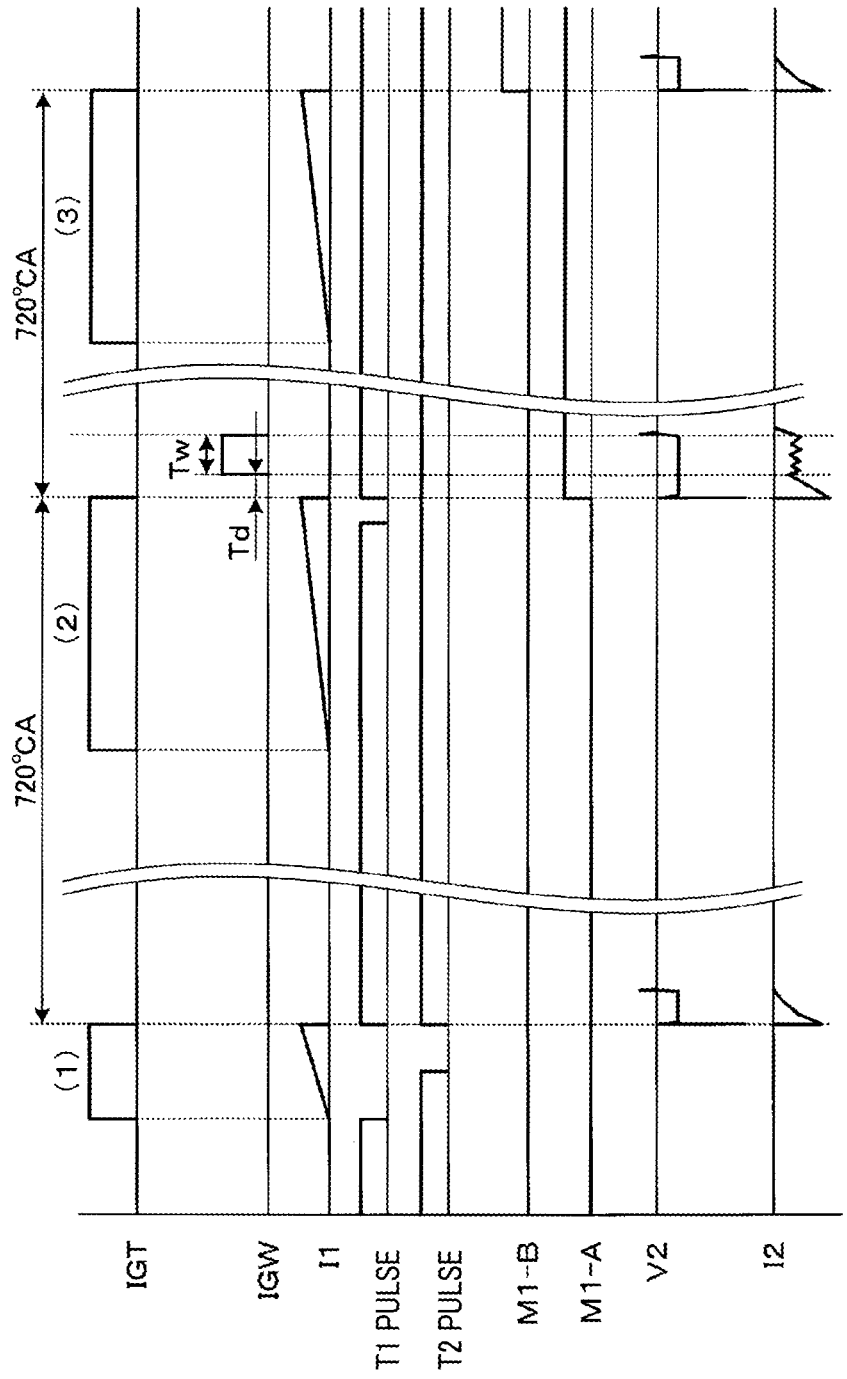
FIG. 5 is a timing diagram showing a trend of the main ignition signal and various signals generated in the signal generation circuit, and a main ignition operation and an energy input operation according to the first embodiment.
Figure 6:
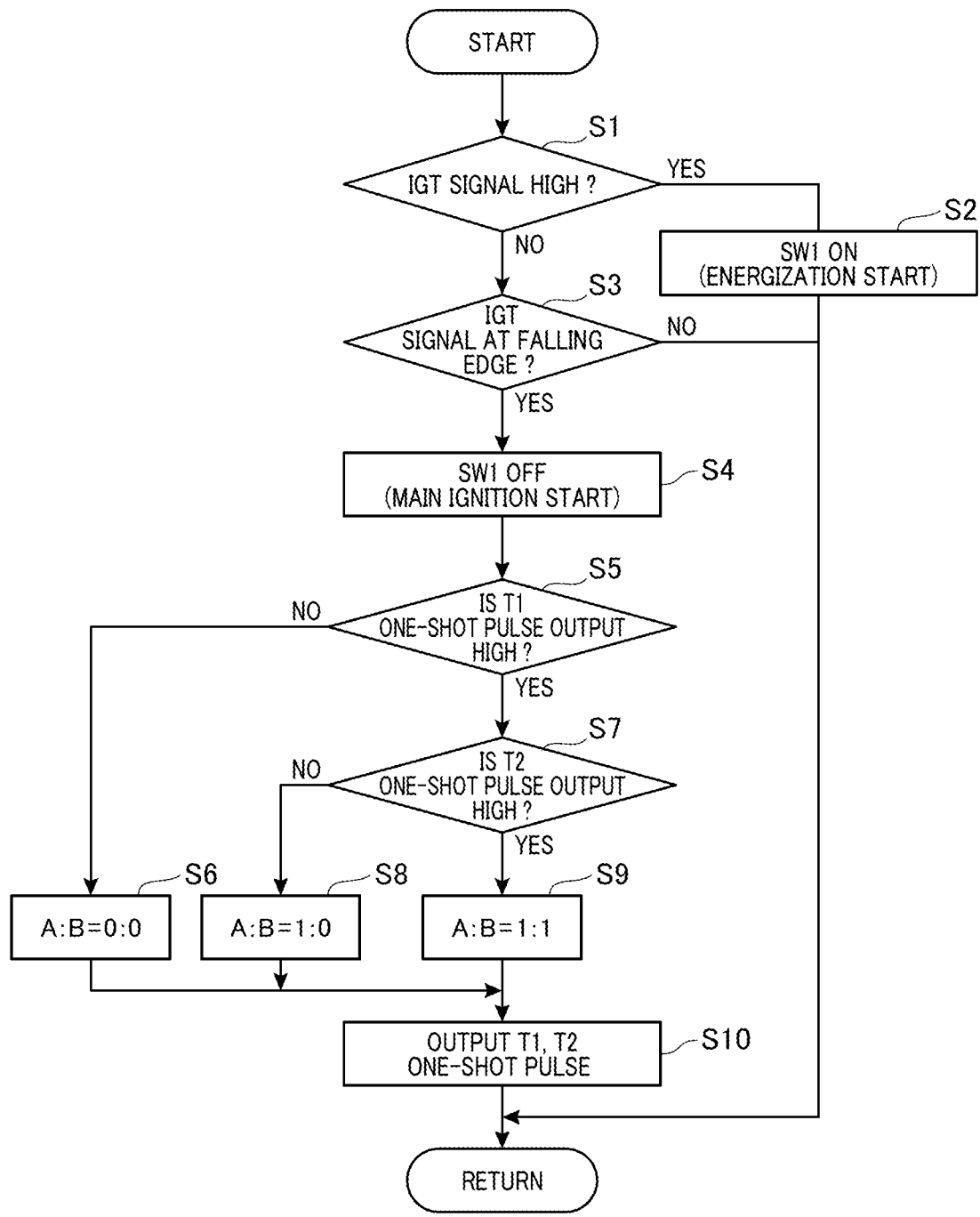
FIG. 6 is a flowchart showing the main ignition operation executed by the ignition device and a speed region determination process executed by the signal generation circuit according to the first embodiment.

With reference to FIGS. 5 and 6, a determination of the speed region in the main ignition operation and the energy input operation will be described. In FIG. 5, the main ignition signals (1) to (3) are shown in which operation waveforms of respective speed regions NE0 to NE2 are compared. Each main ignition signals (1) to (3) becomes active once in the one combustion cycle (e.g. 720° C.A), where the main primary coil 21a is energized at the rising edge and the current of the main primary coil 21a is cutoff at the falling edge, thereby performing the main ignition operation. In the flowchart shown in FIG. 6, steps S1 to S4 correspond to the main ignition operation. Once the present process starts, at step S1, the main ignition signal IGT is determined whether H level or not (i.e. IGT signal High?), the process proceeds to step S2 when the determination is affirmative, and the main ignition circuit 3 turns the main ignition switch SW1 ON. Thereafter, the process returns to the start of the main routine. Thus, the main primary coil 21a of the ignition coil 2 is energized, and continued to be energized during the main ignition signal IGT being High level so that the primary current I1 gradually increases (e.g. I1 shown in FIG. 5).

In the case where the determination at step S1 is negative, the process proceeds to step S3 and determines whether the falling edge of the main ignition signal IGT is detected (i.e. IGT signal falls?). In the case where the determination at step S3 is affirmative, the process proceeds to step S4, turns the main ignition switch SW1 OFF and starts the main ignition operation. Specifically, the main primary coil 21a of the ignition coil 2 is cutoff, whereby high secondary voltage V2 is produced at the secondary coil 22, a spark discharge is generated at the ignition plug P and the secondary current I2 flows (e.g. see V2, I2 shown in FIG. 5). In the case where the determination at step S2 is negative, the process returns to the start of the main routine.

After the main ignition operation, the energy input operation is activated by the energy input signal IGW. The activation of the energy input operation is commanded in accordance with the previous main ignition signal IGT. Hence, prior to the current main ignition operation, the previous main ignition signal IGT in inputted to the speed region determination unit 52 and the IGW generation unit 53, and the T1 pulse and the T2 pulse are outputted from the T1 one-shot pulse generation circuit 521 and the T2 one-shot pulse generation circuit 522 respectively.

For example, the main ignition signal IGT (1) shown in FIG. 5 corresponds to speed region NE0 on a low speed side. Since the previous signal period T of the main ignition signal IGT is longer, the pulse widths T1 and T2 of the T1 pulse and the T2 pulse are shorter than the signal period T corresponding to one combustion cycle. Hence, the T1 pulse and the T2 pulse falls before the falling edge of the current main ignition signal IGT (1), and the S terminals of the first D flip-flop 523 and the second D flip-flop 524 become Low level.

Under this state, when the main ignition signal IGT (1) falls, the outputs of the Q terminals of the first D flip-flop 523 and the second D flip-flop 524 become Low level. Also, a delayed Tw pulse is outputted from the Tw one-shot pulse generation circuit 531 with a Td delay function. A predetermined output start time delayed from the falling edge of the main ignition signal IGT (1) is set to be a delayed period where the signal level of the D terminals of the first and second D flip-flops 523 and 524 after being activated by the previous main ignition signal IGT are reliably latched at the Q terminals and the Q bar terminals and being sufficient for commanding the energy input period. For example, the delay period is set to be 10 μsec to 100 μsec. The Tw pulse is outputted in which the inputs of the first AND gate 532 are High. At this time, the Q bar output of the second D flip-flop which is inputted to the first AND gate 532 becomes High level, but since the Q terminal output of the first D flip-flop 523 is Low level, the energy input signal IGW is not outputted.

On the other hand, the outputs of the A terminal and the B terminal (i.e. M1-A, M1-B shown in FIG. 5) of the first multiplexer M1, to which the Q terminals of the first and second D flip-flops 523 and 524 are connected, become Low level at the falling edge of the main ignition signal IGT (1). Note that Low level signal is continuously outputted when it is in the speed region NE0 before the previous cycle. In this case, as shown in the following table 1, the signal period T of the main ignition signal IGT and the pulse widths T1 and T2 have a relationship T≥T1>T2 and (A:B)=(0:0). Accordingly, the target secondary current value I2tgt is 0 mA, and the output of the X terminal of the first multiplexer M1 becomes zero.

TABLE 1

| T (A:B) | Energy input operation | I2tgt |
|---|---|---|
| T ≥ T1 > T2 (0:0) | Not performed | 0 mA |
| T1 > T ≥ T2 (1:0) | Performed (Tw) | 80 mA |
| T1 > T2 > T (1:1) | Not performed | 0 mA |

Moreover, the main ignition signal IGT (2) corresponds to the speed region NE1 which is a higher speed region than the speed region NE0, and the signal period T becomes short. Hence, only the T2 pulse falls prior to the falling edge of the current main ignition signal IGT (2), and the T1 pulse stays at High level. Under this state, when the main ignition signal IGT (2) falls, the Q terminal output of the first D flip-flop 523 becomes High level. The Q terminal output of the second D flip-flop 524 becomes Low level and the Q bar output becomes High level. Moreover, the Tw pulse outputted by the Tw one-shot pulse generation circuit 531 with a Td delay function becomes High level, whereby the first AND gate 532 becomes active to output the energy input signal IGW.

On the other hand, the outputs of the A terminal and the B terminal (i.e. M1-A, M1-B shown in FIG. 5) of the first multiplexer M1, to which the Q terminals of the first and second D flip-flops 523 and 524 are connected, become High level and Low level respectively at the falling edge of the main ignition signal IGT (2). In this case, the relationship between the pulse widths T1 and T2 is T1>T≥T2 and (A:B)=(1:0), and the target secondary current value I2tgt is set to be 80 mA. Thus, the target secondary current command signal IGA corresponding to the target secondary current value I2tgt is outputted from the X terminal of the first multiplexer M1.

Therefore, after a predetermined delay time Td elapses, the energy input circuit 4 drives the discharge continuation switch SW2 to be ON, thereby performing the energy input operation. Specifically, the sub primary coil 21b is energized and the secondary current I2 is superposed to maintain the spark discharge. At this moment, the discharge energy to be superposed is commanded by the target secondary current command signal IGA and compared with the second current measurement value. Then, the drive signal of the discharge continuation switch SW2 is feedback controlled such that the secondary current I2 is the target secondary current value I2 tgt with the feedback signal SFB which is a comparison result transmitted from the feedback control unit 6.

Also, the main ignition signal IGT (3) corresponds to the speed region NE2 which is a higher speed region than the speed region NE1, and the signal period T is short. Accordingly, the T1 pulse and the T2 pulse stay at High level at the falling edge of the current main ignition signal IGT (3). With this state, if the main ignition signal IGT (3) falls, the Q terminal outputs of the first D flip-flop 523 and the second D flip-flop 524 become High level. At this moment, since the Q bar output of the second D flip-flop 524 becomes Low level, even if the Tw pulse outputted from the Tw one-shot pulse generation circuit 531 with Td delay function becomes High level, the energy input signal IGW of the first AND gate 532 is not outputted.

On the other hand, the outputs of the A terminal and the B terminal (i.e. M1-A, M1-B shown in FIG. 5) of the first multiplexer M1, to which the Q terminals of the first and second D flip-flops 523 and 524 are connected, become High level at the falling edge of the main ignition signal IGT (3). In this case, since the relationship between the pulse widths T1 and T2 of the T1 pulse and the T2 pulse is T1>T2>T and (A:B)=(1:1), the target secondary current command signal IGA which is an output of the X terminal of the first multiplexer M1 is zero and the target secondary current value I2 tgt is 0 mA.

Steps S5 to S10 shown in FIG. 6 correspond to determination of this speed region. At step S5, the process determines whether the output of the T1 pulse is High level or not (i.e. Is output of T1 one-shot pulse High?). The T1 pulse is outputted based on the previous main ignition signal IGT. In the case where the determination at step S5 is negative, the process proceeds to step S6 and determines as (A:B)=(0:0). In other words, this corresponds to a case of the main ignition signal IGT (1). Thereafter, the process proceeds to step S10.

When it is determined as affirmative at step S5, the process proceeds to step S7 and determines whether the output of the T2 pulse is High level or not (i.e. Is output of T2 one-shot pulse High?). The T2 pulse is outputted based on the previous main ignition signal IGT. In the case where the determination at step S7 is negative, the process proceeds to step S8 and determines as (A:B):(1:0). In other words, this corresponds to a case of the main ignition signal IGT (2). Thereafter, the process proceeds to step S10. In other words, this corresponds to a case of the main ignition signal IGT (2). Thereafter, the process proceeds to step S10.

In the case where the determination at step S6 is affirmative, the process proceeds to step S9 and determines as (A:B)=(1:1). In other words, this corresponds to a case of the main ignition signal IGT (1). Thereafter, the process proceeds to step S10. At step S10, the T1 pulse and the T2 pulse (i.e. T1, T2 one-shot pulse output) outputted with a predetermined pulse periods T1 and T2, respectively. These T1 pulse and T2 pulse are used for determining the speed region in the ignition control based on the next main ignition signal IGT. Note that the step sequence from step S5 to step S10 correspond to a sequence for generating the T1 one-shot pulse and the T2 one-shot pulse through the C terminal (clock) inputs of the first D flip-flop and the second D flip-flop, and the signal delay circuit composed of the first inverter 525 and the second inverter 526. This sequence is utilized thereby determining the speed region and generating the target current command signal IGT at a single falling edge timing of the main ignition signal IGT.

The determination process of the speed region is not necessarily performed for each one combustion cycle, but may be performed using the signal period T between plurality of combustion cycles. Thus, by using main ignition signal IGT of a plurality of combustion cycles, engine speed information is averaged to stabilize the switching operation. Alternatively, the switching operation is not necessarily performed in each determination of the speed region so that the switching operation may be performed in accordance with a plurality of determination result, or a hysteresis may be applied to the determination result. Thus, chattering or the like in the switching operation can be suppressed, thereby stabilizing the switching operation.

Thus, the engine operation region is determined with the engine speed, whereby a speed region including an operation region where it is difficult to ignite can be selected and the energy input operation can be performed with the main ignition signal IGT. For example, an energy input operation is performed only for a speed region in which high G/F (i.e. gas/fuel ratio) operation or high A/F (air/fuel ratio) operation is performed, whereby ignitability is enhanced so that fuel efficiency is improved.

As described, according to the present embodiment, the energy input signal IGW and the target secondary current command signal IGA can be generated only from the main ignition signal IGT transmitted to the ignition device 10 from the engine ECU 100. Hence, the transmitted signal from the engine ECU 100 is not necessarily changed. Hence, since only one signal line is required for transmitting the main ignition signal IGT, the number of signals provided in respective apparatuses or the number of signal lines for connecting between apparatuses can be reduced. Further, since the ignition signal IGT being used can be used without modification an ignition device 10 capable of being energy-inputted can be mounted after the manufacturing without any specification change for the engine ECU 100 side. As a result, the energy input operation subsequent to the main ignition operation can be optimally controlled, and thus a small-sized and high performance ignition device 10 of an internal combustion engine can be achieved.

The control of the main ignition operation and the determination of speed region in the energy input operation are described with reference to the flowchart shown in FIG. 6 for making it easier to understand. The determination process is not limited to software processes but can be configured as hardware.

Here, as a modification example of the above-described first embodiment, the Q bar output of the second D flip-flop connected to the first AND gate 532 may be omitted to change the target secondary current command signal IGA to be zero level, thereby omitting the energy input operation. In this case, the circuit configuration is simplified so that overall device configuration can be further simplified. Moreover, the output of the Tw one-shot pulse generation circuit with Tf delay function and the Q terminal outputs of the first D flip-flop 523 and the second D flip-flop 524 may be each activated with a high-preset in the power-on and in an event of engine stop. With this configuration, the energy input operation can be performed without delay even in the engine start operation.

Second Embodiment

Figure 7:
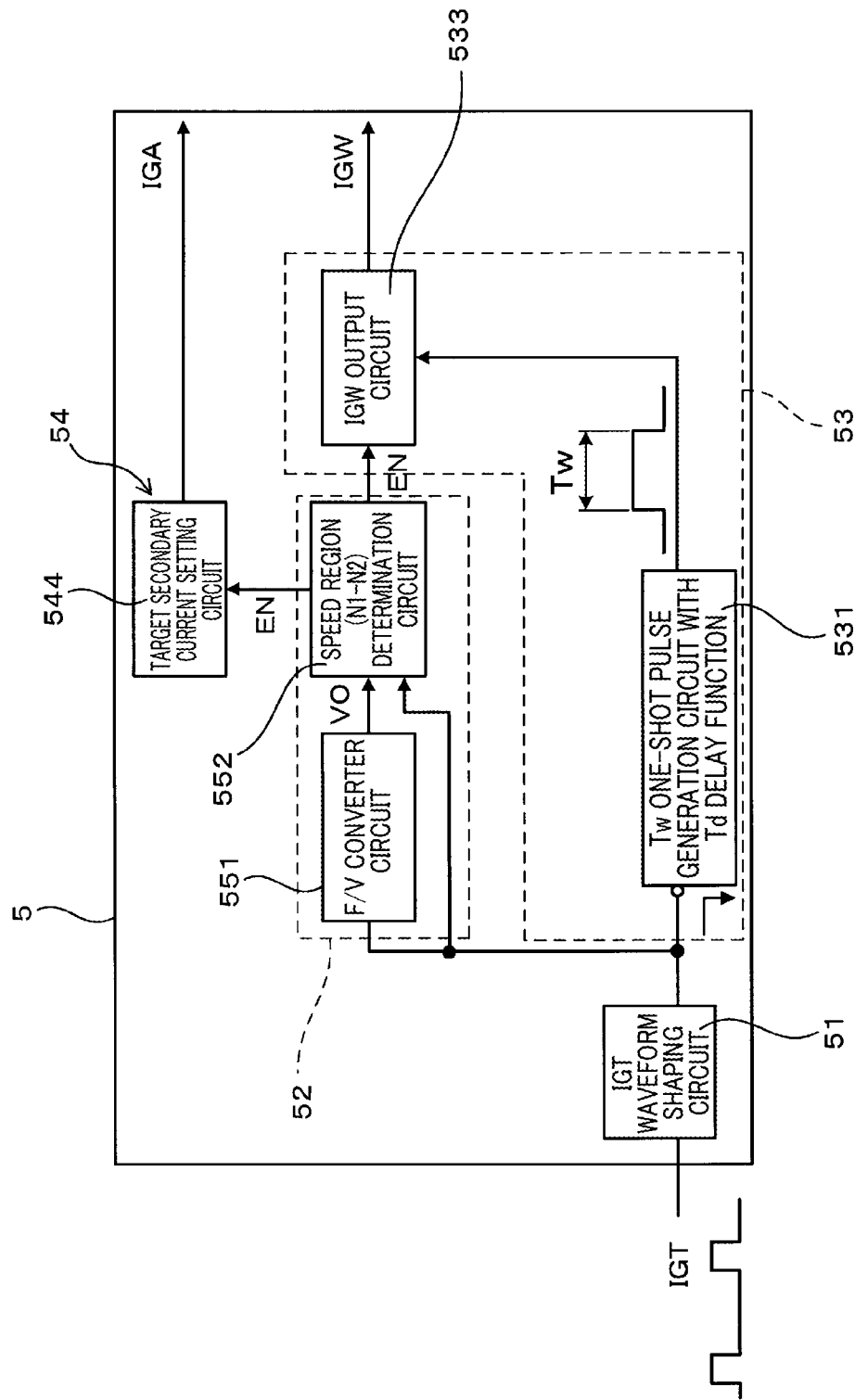
FIG. 7 is a circuit diagram showing the signal generation circuit that constitutes an ignition device according to a second embodiment.
Figure 8:
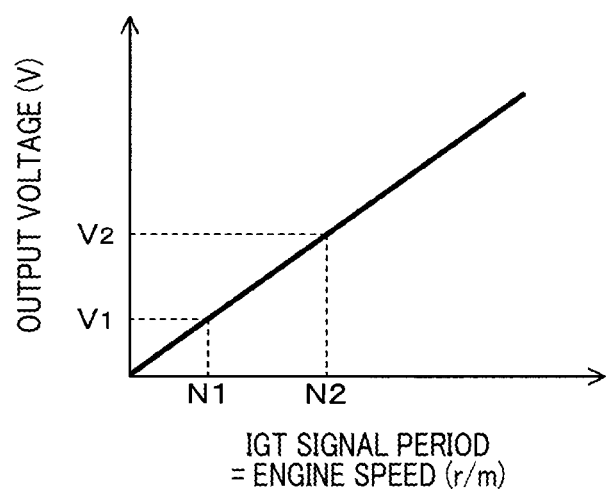
FIG. 8 is a graph showing a relationship between an output voltage of a F/V converter circuit and an engine speed according to the second embodiment.
Figure 9:
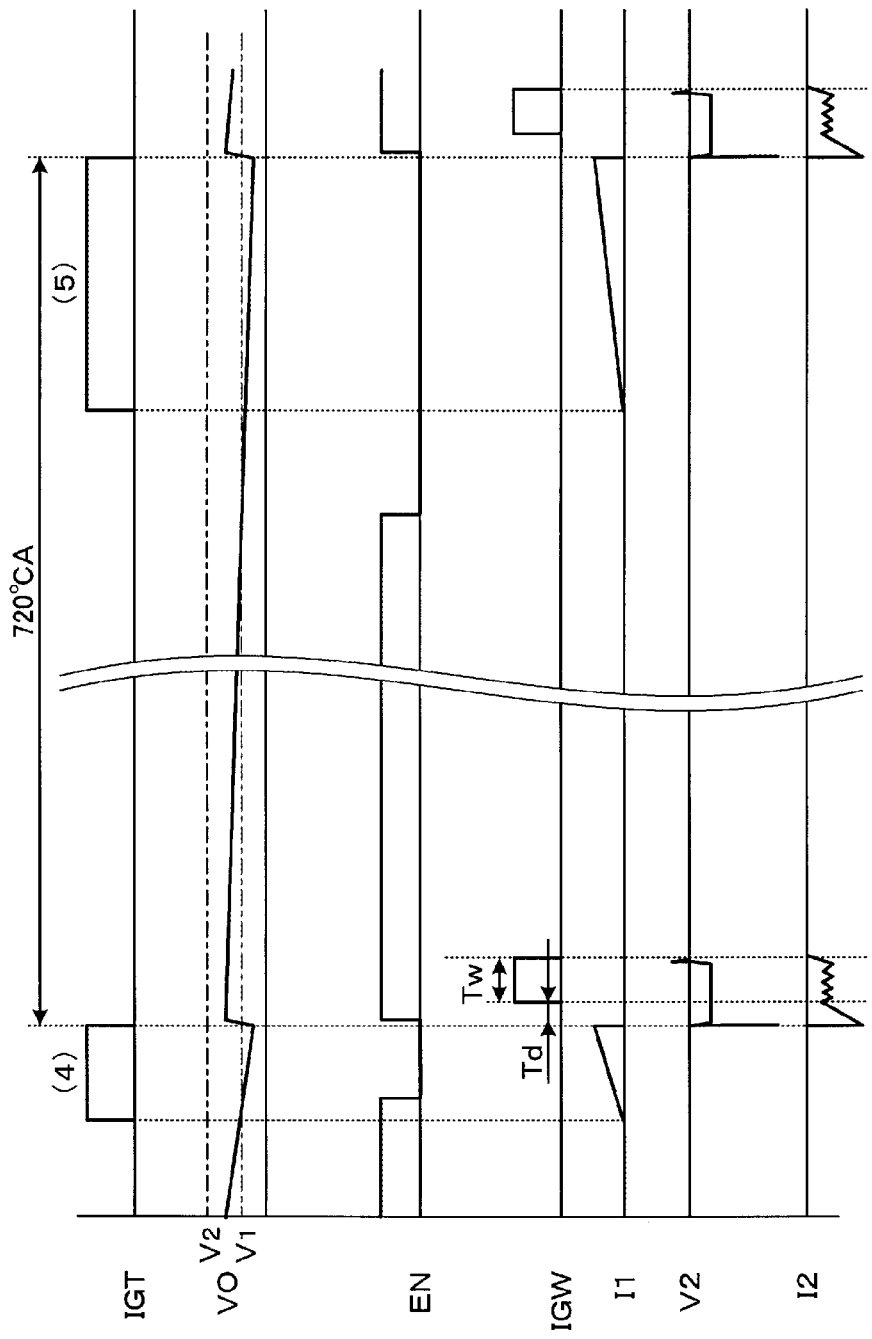
FIG. 9 is a timing diagram showing a trend of the main ignition signal and various signals generated in the signal generation circuit, and a main ignition operation and an energy input operation according to the second embodiment.

With reference to FIGS. 7 to 9, a second embodiment for an ignition control device of an internal combustion engine will be described. The present embodiment differs from the first embodiment in that the configuration of the speed region determination unit 52 in the signal generation circuit 5 that generates the energy input signal IGW and the target secondary current command signal IGA from the main ignition signal IGT for determining the engine operation region. Since the fundamental configuration of the ignition control device 1 provided with the ignition device 10 and the engine ECU 100 is similar to the above-described first embodiment, hereinafter, differences mainly will be described. Note that reference symbols same as those used in the foregoing embodiments among reference symbols to be used in the second embodiment and latter embodiments represent constituents similar to those in the foregoing embodiments.

In FIG. 7, the signal generation circuit 5 is provided with an IGT waveform shaping circuit 51, a speed region determination unit 52 that determines the speed region, an IGW generation unit 53 that generates the energy input signal IGW and an IGA generation unit 54 that generates the target secondary current command signal IGA. The main ignition signal IGT inputted to the signal generation circuit 5 is applied with a filtering process in the IGT waveform shaping circuit 51. The main ignition signal IGT in which the filtering process is applied as a noise-removed signal, is applied to the speed region determination unit 52 and the IGW generation unit 53. The configuration of the IGW generation unit 53 is similar to that of the above-described first embodiment, and the explanation thereof will be omitted or simplified.

The speed region determination unit 52 includes a F/V converter circuit 551 and a speed region determination circuit 552. The main ignition signal IGT is transmitted to the F/V converter circuit 551. For example, the F/V converter circuit 551 generates a falling signal at a differential circuit with the transmitted pulsed main ignition signal IGT, calculates the frequency for each one period of the signal, converts the signal to be a voltage signal VO and outputs the voltage signal VO. The output-voltage characteristics is shown in FIG. 8. The output voltage of the F/V converter 551 is proportional to the engine speed which is correlated to the signal period of the main ignition signal IGT. Hence, with this relationship, it can be determined whether the engine speed reaches a predetermined engine speed in accordance with output voltage of the F/V converter circuit 551.

Even in this case, the signal period of the main ignition signal IGT transmitted to the F/V converter circuit 551 may be set to be a period between falling edge signals. The signal period is synchronized to the falling edge position which corresponds to the ignition timing not the rising edge position corresponding to the energization start timing, whereby a period variation is reduced and the detection accuracy can be secured.

Specifically, two engine speeds (e.g. N1, N2; N1<N2) and two corresponding reference voltages (e.g. V1, V2; V1 V2) are set in advance in order to determine a predetermined speed region where the energy input operation is performed. At this time, when the voltage output signal VO outputted from the F/V converter circuit 551 is within a range V1≤VO<V2, the speed region can be determined as a region where the energy input operation is performed. On the other hand, when the voltage output signal VO outputted from the F/V converter circuit 551 is within a range VO<V2 or V2≤VO, the speed region is determined as a region where the energy input operation is not performed. Thus, three speed regions can be determined using the two reference voltages V1 and V2.

The speed region determination circuit 552 compares the voltage signal VO outputted by the F/V converter 551 with the reference voltages V1 and V2 to determine the speed region. In the case where the voltage signal Vo is within a range determined by the reference voltages V1 and V2, the speed region determination circuit 552 determines that a speed region is within a predetermined speed region, and generates/outputs an enable signal that enables the energy input operation. The enable signal EN serves as a command signal for enabling/inhibiting the energy input signal IGW and the target secondary current command signal IGA.

For the IGA generation unit 53, for example, in the case where the enable signal EN connected to the IGW output circuit 533 is active to enable the energy input signal IGW, and when the Tw pulse from the input terminal of the Tw one-shot pulse generation circuit 531 with Td delay function is received, the IGA generation circuit 53 outputs the Tw pulse as the energy input signal IGW. The IGA generation unit 54 outputs, in response to activation of the enable signal EN, the target secondary current command signal IGA corresponding to the target secondary current value I2tgy set in advance based on the predetermined speed region.

As shown in FIG. 9, the main ignition signal IGT is outputted at each combustion cycle (e.g. 720° C.A) and speed region is determined using the F/V converter circuit 551 at the falling edge positions thereof. For example, the voltage signal VO outputted from the F/V converter signal is compared with the reference voltage immediately after the falling edges of the main ignition signal IGT (4) and (5), and the enable signal EN becomes High level when the voltage signal VO is between the reference voltages V1 and V2. Thereafter, because of the operation of the F/V converter, when the voltage signal VO gradually decreases to be lower than the reference voltage V1, the enable signal EN becomes L level.

Accordingly, the enable signal EN becomes High level immediately after the falling edge of the main ignition signal IGT (4), (5), the energy input signal IGW having a pulse width Tw is outputted with a predetermined delay Td, and then the energy input operation is performed after the delay time Td is elapsed. Further, the secondary current I2 is feed-back controlled based on the target secondary current command signal IGA outputted from the target secondary current setting circuit 541. The determination of the speed region using the output of the F/V converter circuit 551 may be performed at each falling edge of the main ignition signal IGT or may be performed one time in a plurality of falling edges. Alternatively, the determination of the speed region may be arbitrarily set such that a plurality of determination results are averaged. The determination with the reference voltage may be performed at the falling edge of the main ignition signal IGT, and the determination result may be held for four combustion cycles for the control, thereby stabilizing the energy input operation.

Thus, according to the signal generation circuit 5 of the present embodiment, the energy input signal IGW and the target secondary current command signal IGA can be generated only with the main ignition signal IGT. Moreover, the energy input operation subsequent to the main ignition operation can be optimally controlled, and thus a small-sized and high performance ignition device 10 of an internal combustion engine can be achieved. Further, since the ignition signal IGT being used can be used without any changes, an ignition device 10 capable of being energy-inputted can be mounted after the manufacturing without any specification change for the engine ECU 100 side.

Third Embodiment

Figure 10:
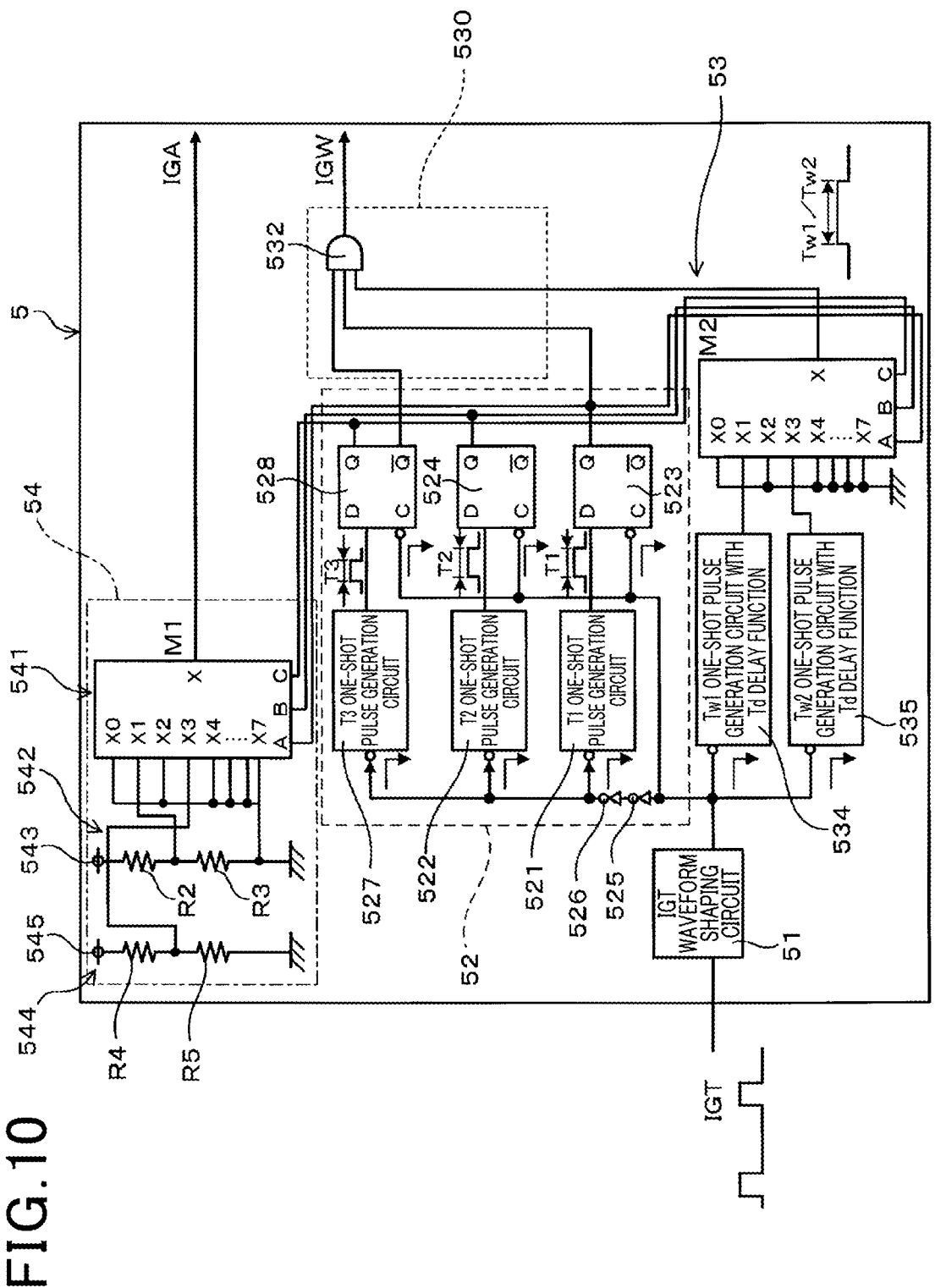
FIG. 10 is a circuit diagram showing a signal generation circuit that constitutes an ignition device according to a third embodiment.
Figure 11:
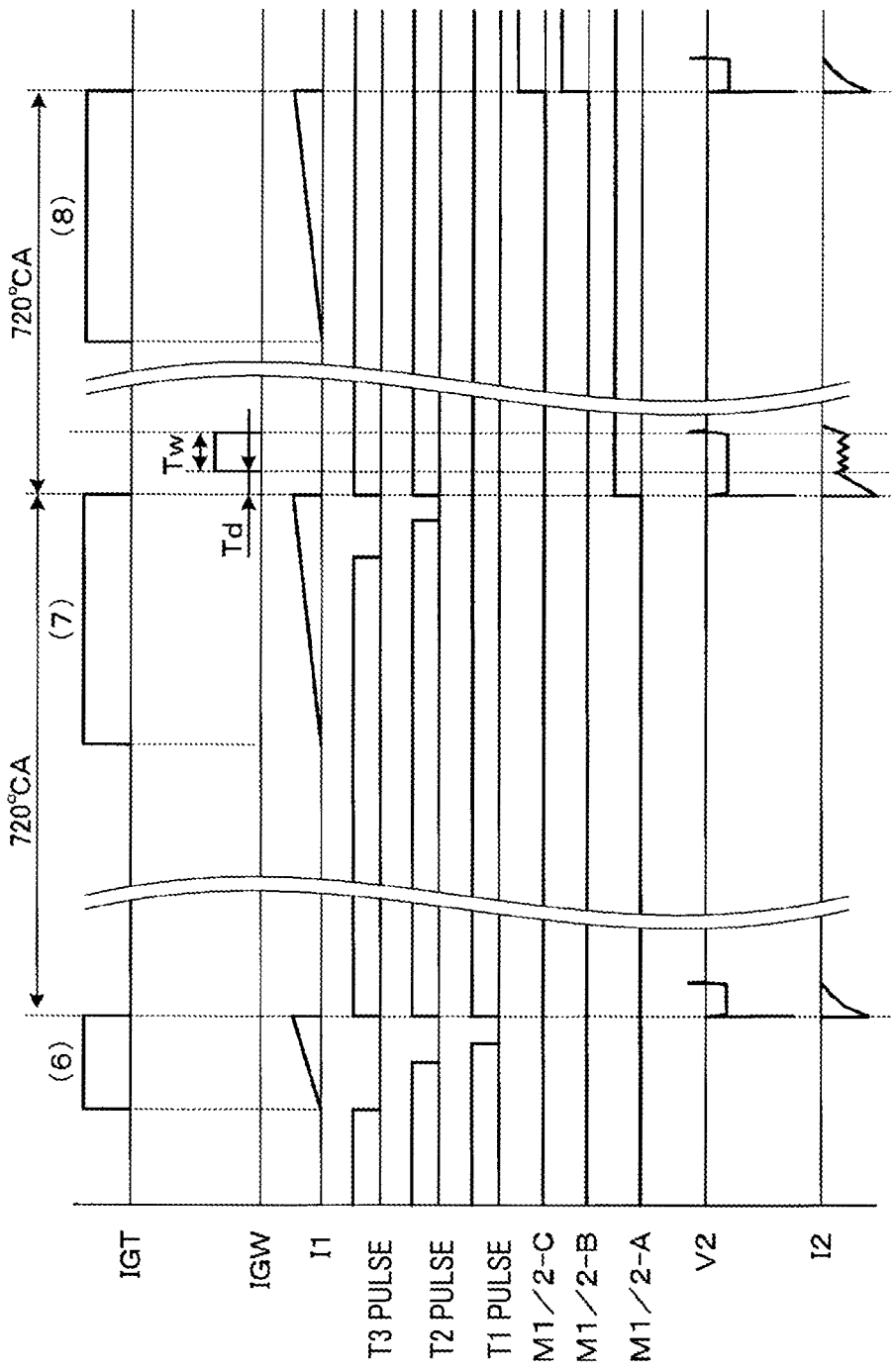
FIG. 11 is a timing diagram showing a trend of the main ignition signal and various signals generated in the signal generation circuit, and a main ignition operation and an energy input operation according to a fourth embodiment.

With reference to FIGS. 10 to 11, a third embodiment of an ignition control device of an internal combustion engine will be described. According to the above-described embodiments, a case is described in which three speed regions are set in the speed region determination unit 52 of the signal generation circuit 5, and an energy input operation is performed in one speed region among these speed regions. However, the energy input operation may be performed in two or more speed regions. In this case, each of the energy input period commanded by the energy input signal IGW and the target secondary current value I2tgt commanded by the target secondary current command signal IGA may be changed. According to the present embodiment, it is exemplified in which the energy input signal IGW and the target secondary current command signal IGA are switched in two speed regions. The fundamental configuration of an ignition control device 1 provided with the ignition device 10 is similar to that of the above-described first embodiment. Hereinafter, different configurations will mainly be described.

In FIG. 10, the signal generation circuit 5 is provided with an IGT waveform shaping circuit 51, a speed region determination unit 52, an IGW generation unit 53 that generates the energy input signal IGW and an IGA generation unit 54 that generates the target secondary current command signal IGA. For the main ignition signal IGT inputted to the signal generation circuit 5, firstly, a filtering process is applied at the IGT waveform shaping circuit 51, the signal to which the filtering process is applied as the pulsed main ignition signal IGT, is transmitted to the speed region determination unit 52 and the IGW generation unit 53.

The IGW generation unit 53 is provided with a Tw1 one-shot pulse generation circuit 534 with a Td delay function, a Tw2 one-shot pulse generation circuit 535 with a Td delay function, a second multiplexer M2 and a first AND gate 532 as an IGW output circuit 530. The Tw1 and Tw2 one-shot pulse generation circuits 534 and 535 each generates an one-shot pulse signal (hereinafter referred to as Tw1 pulse and Tw2 pulse) having a certain pulse width Tw1 and Tw2. The Tw1 and Tw2 one-shot pulse generation circuits 534 and 535 are each triggered by a falling edge of the main ignition signal IGT of the IGT waveform shaping circuit and each outputs the one-shot pulse signal delayed by a delay time Td. Each of the pulse widths Tw1 and Tw2 is a certain period which can be used as an energy input signal IGW that commands the energy input period. The pulse widths Tw1 and Tw2 are set in advance to be different time from each other (e.g. Tw1<Tw2).

The second multiplexer M2 is configured as same as the first multiplexer M1 of the IGA generation unit 54 which will be described later. The second multiplexer M2 selects one of eight input terminals X0 to X7 based on the logic determined by the input signals of the A to C terminals (A:B:C). The input voltage signal (X0 to X7) of the selected input terminals is inputted to the first AND gate 532 via the X terminal. The first AND gate 532 generates the energy input signal IGW based on the logical AND between the output of the speed region determination unit 52 and the output of the second multiplexer M2. Note that the relationship between (A:B:C) and (X0 to X7) is as follows.

(A:B:C)=(0:0:0):X0
(A:B:C)=(1:0:0):X1
(A:B:C)=(0:1:0):X2
(A:B:C)=(1:1:0):X3
(A:B:C)=(0:0:1):X4
: :
: :
(A:B:C)=(1:1:1):X7

The speed region determination unit 52 includes a T3 one-shot pulse generation circuit 527 in addition to the T1 one-shot pulse generation circuit 521 and the T2 one-shot pulse generation circuit 522. Also, the speed region determination unit 52 includes a third D flip-flop 528 in addition to the first D flip-flop 523 and the second D flip-flop 524. The output terminal of the IGT waveform shaping circuit 51 is connected in parallel to the input terminals of the T1 to T3 one-shot pulse generation circuits 521, 522 and 527 via the first inverter 525 and the second inverter 526, and also connected in parallel to the C terminals of the first to third D flip-flop 523, 524 and 528.

Similar to the first and second D flip-flop 523 and 524, the T3 one-shot pulse generation circuit 527 is triggered by the falling edge of the main ignition signal IGT to generate an one-shot pulse signal (hereinafter referred to as T2 pulse) having a certain pulse width T3 and outputs the generated pulse only for one time. The output terminals of the T1 to T3 one-shot pulse generation circuit 521, 522 and 527 are connected to the D terminals of the first to third D flip-flop 523, 524 and 528 respectively, to which the T1 to T3 pulses are inputted.

The pulse widths T1 to T3 are set to be different from each other (e.g. T1>T2>T3) such that the pulse widths equal the signal period T of the falling edge of the main ignition signal IGT corresponding to the predetermined engine speed. Thus, three pulse widths T1 to T3 are set corresponding to the upper limit and the lower limit of two speed regions for performing the energy input operation, thereby determining whether it is in a predetermined two speed regions (a speed region determined by pulse widths T1 and T2 or a speed region determined by pulse width T2 and T3 and determining whether the energy input operation is performed.

The first to third flip-flop 523, 524 and 528 latch, as a logic level of the D terminals, the signals outputted at the falling edge of the previous main ignition signal IGT at each falling edge of the main ignition signal IGT inputted to the C terminals, and output them to the Q terminals. The Q terminals of the first to third D flip-flop 523, 524 and 528 are connected to the A to C terminals of the first multiplexer M1, respectively. The output terminal of the Tw1 one-shot pulse generation circuit 534 having a Td delay function is connected to the X1 terminal of the second multiplexer M2, and The output terminal of the Tw2 one-shot pulse generation circuit 535 having a Td delay function is connected to the X3 terminal of the second multiplexer M2. The X0 terminal and the X1 terminal are connected to the ground terminal.

The Q terminal of the first D flip-flop 523 and the Q bar terminal of the third D flip-flop 527 are connected to the first AND gate 532. An inverted signal of the Q terminal is outputted at the Q bar terminal of the third D flip-flop 527. Thus, in the case where the signal period T of the main ignition signal IGT is within a range of a pulse widths T1 to T3 and the X terminal of the second multiplexer M2 is connected to the X1 terminal or the X3 terminal, and then the Tw1 pulse or the Tw2 pulse is outputted, the output of the first AND gate 532 becomes High level. In other words, the selected Tw1 pulse or the Tw2 pulse is outputted as the energy input signal IGW. The following table 2 shows a relationship between a combination (A:B:C) corresponding to four speed regions including predetermined two speed regions and a determination whether the energy input operation is performed.

TABLE 2

| T (A:B:C) | Energy input operation | I2tgt |
|---|---|---|
| T ≥ T1 > T2 > T3 (0:0:0) | Not performed | 0 mA |
| T1 > T ≥ T2 > T3 (1:0:0) | Performed (Tw1) | 80 mA |
| T1 > T2 > T ≥ T3 (1:1:0) | Performed (Tw1) | 100 mA |
| T1 > T2 > T3 > T(1:1:1) | Not performed | 0 mA |

On the other hand, the Q terminals of the first to third flip-flop 523, 524, 528 are connected to the A to C terminals of the first multiplexer terminal M1, respectively. The first multiplexer M1, similar to the second multiplexer M2, selects one of four input terminals X0 to X3 based on the logic determined by the input signals of the A to C terminals (A:B:C) and outputs the selected input voltage signal (X0 to X3) to the X terminal.

According to the first embodiment, the target secondary current command signal IGA is outputted only when the X1 terminal is selected. According to the present embodiment, a second voltage divider 544 is provided and the target secondary current command signal IGA is outputted even when the X3 terminal is selected. The second voltage divider 544 divides the voltage of the second voltage source 545 using two resistors R4 and R5 to generate the reference voltage signal X3 (e.g. X3>X1), and outputs the generated voltage signal X3 to the X3 terminal of the first multiplexer M1. The reference voltage signal X3 corresponds to, for example, a target secondary current value I2tgt for the energy input operation based on the Tw2 pulse.

As shown in FIG. 11, the speed region can be determined in accordance with relationship between the main ignition signal (6) to (8), the waveform of the T1 to T3 pulses, and the output (i.e. M1/2-A to M1/2-C shown in FIG. 11) of the A to C terminals of the second multiplexer M1 and M2. Further, as shown in the above-described table 2, a plurality of target secondary current value I2tgt can be set corresponding to the plurality of speed regions.

For example, any of the T1 to T3 pulses are Low level at the falling edge of the main ignition signal IGT (6) which corresponds to (A:B:C)=(0:0:0) in the table 2. Hence, the output level of the target secondary current command signal IGA becomes zero level. Accordingly, the energy input operation is not performed and the target secondary current value I2tgt is 0 mA. For the main ignition signal IGT (7), the T1 pulse is High level at the falling which corresponds to (A:B:C)=(1:0:0). Hence, X1 is selected at the M1 output and the energy input operation is performed. At this moment, the Tw1 pulse is outputted as the energy input signal IGW and the target secondary current value I2tgt becomes 80 mA.

For the main ignition signal IGT (8), any of the T1 to T3 pulses are High level at the falling edge of the main ignition signal (8) which corresponding to (A:B:C)=(1:1:1). Therefore, X7 is selected at the M1 output and the output of the target secondary current command signal IGA becomes zero level. Accordingly, the energy input operation is not operated and the target secondary current value I2tgt is 0 mA. In the case where T1 and T2 pulses are High level and the T3 pulse is Low level causing the combination to be (A:B:C) =(1:1:0), X3 is selected at the M1 output and the Tw2 pulse is outputted as the energy input signal IGW, and then the target secondary current value I2tgt becomes 100 mA.

Similarly, the energy input signal IGW and the target secondary current command signal IGA may be switched in three or more speed regions. In this case, since the energy input operation can be precisely controlled, optimal energy input operation can be performed depending on the engine operation state. For example, as described above, in the case where an operation control in which the G/F or A/F varies depending on the engine speed is performed, an energy input operation depending on the speed region can be performed. Therefore, both high ignitability and low fuel consumption can be accomplished.

Further, the energy input signal IGW and the target secondary current command signal IGA may be switched based on the power source voltage, or may be switched depending on a combination of the speed region and the power source voltage. For example, in the case where voltage supplied from the DC power supply B varies, since the energy capable of superposing also varies, it is able to follow the variation. Specifically, for example, it is determined whether the voltage of the DC power source B is in a predetermined range using a window comparator or the like, whereby the energy input signal IGW or the target current command signal IGA depending on the determination result can be selectively outputted by using a multiplexer or the like.

Thus, according to the present embodiment, the energy input signal IGW and the target secondary current command signal IGA can be generated with only the main ignition signal IGT. Moreover, since the energy input signal IGW and the target secondary current command signal IGA can be switched depending on the speed region, the energy input operation subsequent to the main ignition operation can be optimally controlled. Hence, a small-sized and high performance ignition device 10 of an internal combustion engine can be achieved. Further, since the ignition signal IGT can be used without modification, an ignition device 10 capable of being energy-inputted can be mounted after the manufacturing without any specification change for the engine ECU 100 side.

Fourth Embodiment

Figure 12:
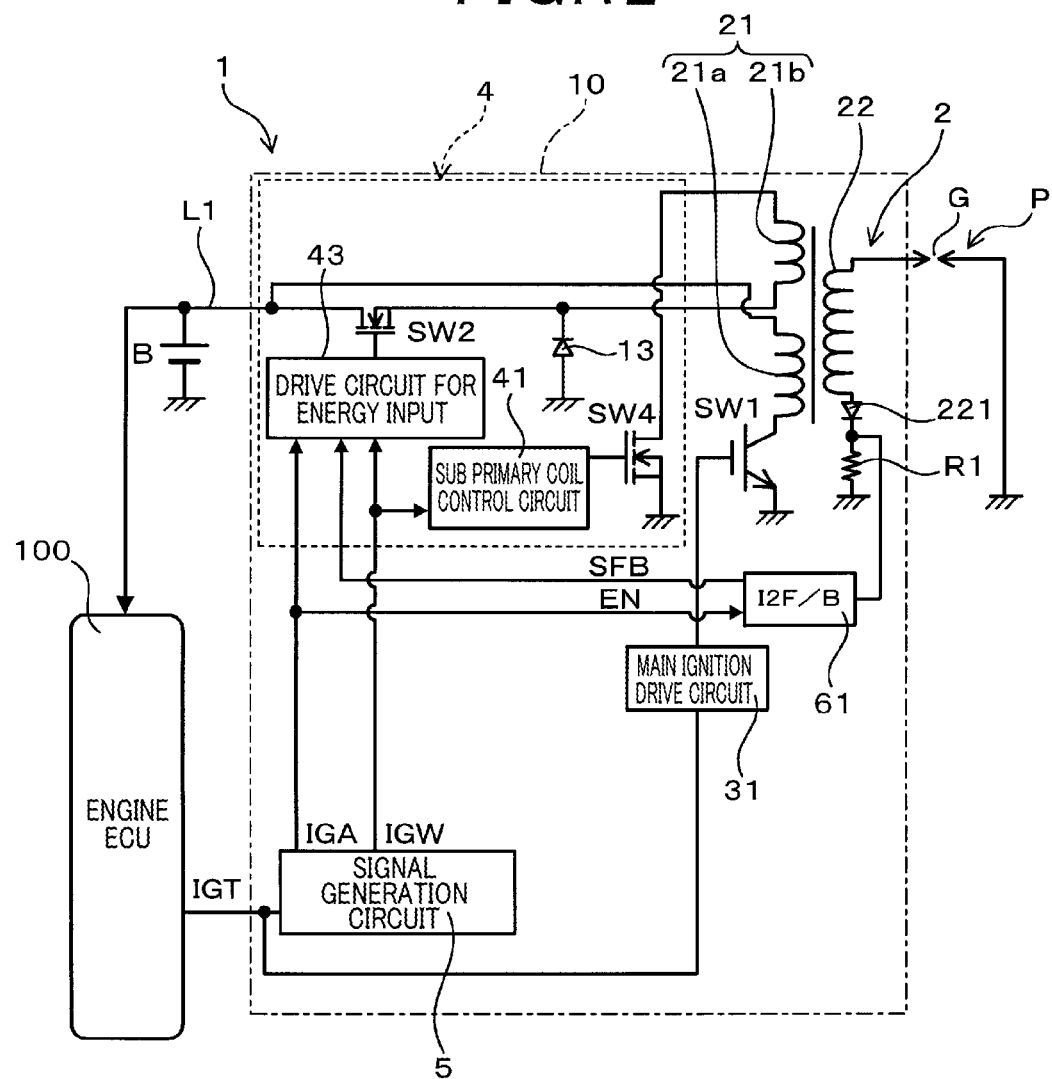
FIG. 12 is a circuit diagram showing an ignition control device of an internal combustion engine according to a fifth embodiment.

With reference to FIG. 12, a fourth embodiment for an ignition control device of an internal combustion engine will be described. According to the present embodiment, the main ignition signal IGT is transmitted to the ignition device 10 from the engine ECU 100, the energy input signal IGW and the target secondary current command signal IGA are generated in the signal generation circuit 5 of the ignition device 1, thereby controlling the ignition of the ignition plug P. At this time, the energy input circuit 4 for performing the energy input operation applied to the ignition coil 2 is not limited to the configuration of the above-described first embodiment, but may utilize a configuration capable of superposing the secondary current I2 having the same polarity in the energy input operation performed after the main ignition operation. Hereinafter, different configurations will mainly be described for other configuration examples such an ignition coil 2 and an energy input circuit 4. Note that other fundamental configurations and operations of the ignition device 10 are similar to those in the above-described first embodiment.

As shown in FIG. 12, the ignition device 2 is configured of a main primary coil 21a and a sub primary coil 21b, in which one end of the primary coil 21a is connected the power line L1 and the other end thereof is connected to the ground via the main ignition switch 1. One end of the sub primary coil 21b is connected to the power line L1 and the other end thereof is connected to the ground via a switching element 4 for enabling an energization (hereinafter referred to as energization enabling switch). The energization enabling switch 4 that constitutes the energy input circuit 4 is OFF during the main ignition operation, and turns ON in response to a drive signal of the sub primary coil control circuit 41 while being energized due to High level output of the signal IGW.

For the power line 1, a discharge continuation switch SW2 is provided at a connection point between the main primary coil 21a and the sub primary coil 21b, and a fourth diode 13 is provided between the discharge continuation switch SW2 and the sub primary coil 21b. For the fourth diode 13, the anode terminal is grounded and the cathode terminal is connected to the power line L1. Thus, a reflux current flows when the discharge continuation switch SW2 is OFF so that the current of the sub primary coil 21b gradually increases. Hence, the secondary current I2 can be prevented from rapidly decreasing.

The discharge continuation switch SW2 is driven between ON and OFF by a switch drive circuit 43 for energy input (hereinafter referred to as energy input drive circuit). The energy input drive circuit 43 drives, based on the command signal from the sub primary control circuit 41, the discharge continuation switch SW2 after a predetermined delay time Td, thereby performing the energy input operation. The sub primary coil control circuit 41 outputs the command signal to the energy input drive circuit 43 to obtain the target secondary current value I2tgt which is commanded by the target secondary current command signal IGA, based on the feedback signal SFB.

Thus, while the energy input operation is being performed, a feedback control based on the target secondary current value I2tgt is performed.

Fifth Embodiment

Figure 13:
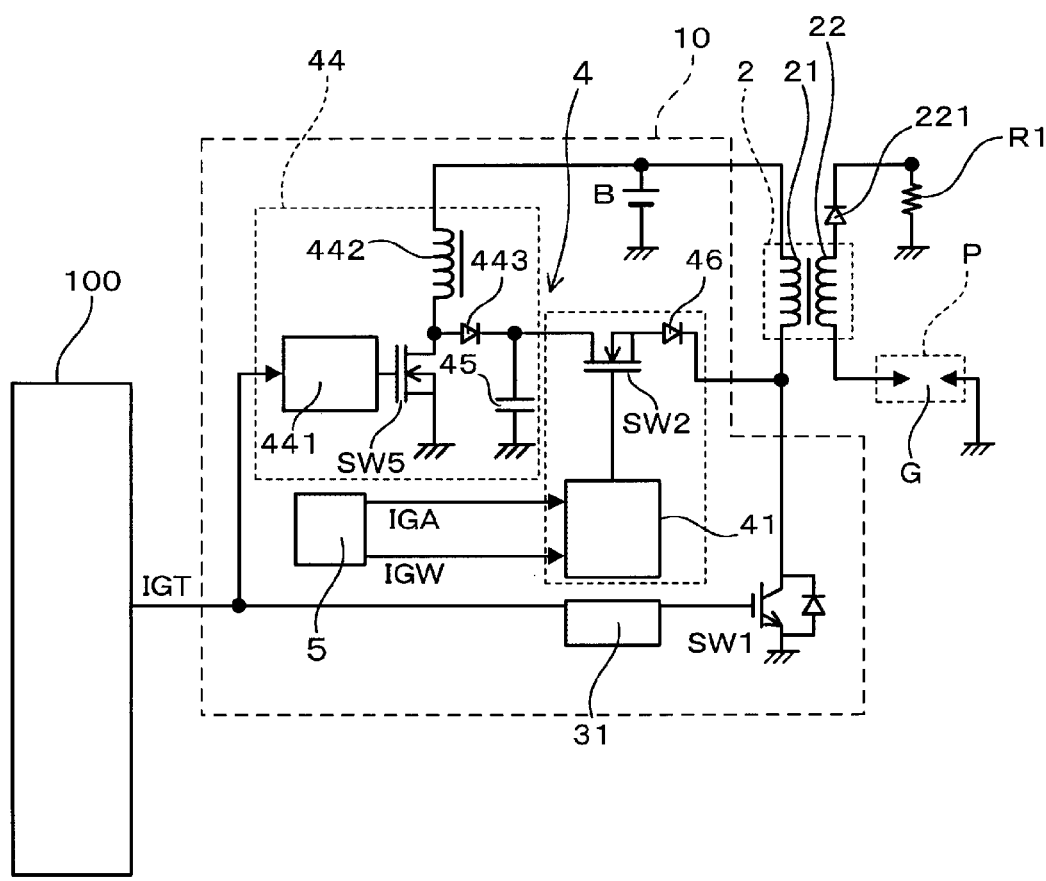
FIG. 13 is a circuit diagram showing an ignition control device of an internal combustion engine according to a sixth embodiment.

With reference to FIG. 13, a fifth embodiment for an ignition control device of an internal combustion engine will be described. According to the above-described embodiments, the primary coil 21 of the ignition coil 2 is configured of the main primary coil 21a and the sub primary coil 21b which are connected in parallel relative to the DC power source B. However, it is not limited thereto. As shown in FIG. 13, the ignition coil 2 may be configured of a primary coil 21 and a secondary coil 22. Also, a boost circuit 44 and a capacitor 45 may be provided in the energy input circuit 4 such that the energy stored in the capacitor 45 is superposed to the primary side of the primary coil 21.

According to the present embodiment, the boost circuit 44 is provided with a boost switching element (hereinafter referred to as boost switch) SW5, a boost drive circuit 441 for driving the boost switch SW5, a choke coil 442 and a fifth diode 443. The boost drive circuit 441 drives the boost switch SW5 to perform a switching operation so as to have the energy. generated in the choke coil 442 stored into the capacitor 45. The discharge continuation switch SW2 is connected between the primary coil 21 and the main ignition switch SW1 via the sixth diode 46, and driven by the sub primary coil 41. The forward direction of the fifth diode 443 is a direction towards capacitor 45, and the forward direction of the sixth diode 46 is a direction towards the primary coil 21.

The boost dive circuit 441 is driven in accordance with the main ignition signal IGT to charge the capacitor 45 during the main ignition operation. The sub primary coil control circuit 41 drives, based on the target secondary current command signal IGA and the energy input signal IGW, the discharge continuation switch SW2 during the energy input operation after the main ignition operation, thereby superposing the energy stored in the capacitor 45 into the ground side of the primary coil 21. With this configuration, the current having the same polarity as the secondary current I2 is increased to perform the energy input operation, whereby a spark discharge can be continued.

Thus, the configurations of the ignition coil 2 and the energy input circuit 4 can be changed arbitrarily. For example, a boost circuit 44 of the fifth embodiment may be provided in the configuration of the above-described first embodiment, and the power is supplied to the boost circuit 44 from the sub primary coil 44, thereby performing the energy input operation. Further, an ignition coil 2 composed of the primary coil 2 and the secondary coil 22 may be provided as a plurality number of pairs such as two pairs of ignition coils 2, in which a main ignition operation is performed using one ignition coil 2 and an energy input operation is performed by using the other ignition coils 2 or alternately using both ignition coils 2, thereby performing the energy input operation. In this case, the boost circuit 44 may be provided to supply power to both two pairs of ignition coils 2, or the primary coil 21 may be configured such that a part of the primary coil 21 is capable of being powered to adjust the secondary voltage.

Further, in the case where two pairs of ignition coils 2 is provided, the secondary coils 22 may be connected in series in which the secondary current generated in one secondary coil 22 is supplied to the other secondary coil 22. In either case, a diode or the like may preferably be provided to determine the direction of the current such that rapid decrease or increase in the current due to switching operation is suppressed. Hence, stable discharging can be continued.

According to the above-described embodiments, both of the energy input signal IGW and the target secondary current command signal are generated in the signal generation circuit 5. However, for example, the energy input operation may always be performed. In this case, for example, the energy input period is set to be fixed period, the target secondary current value I2tgt can be commanded by the target secondary current command signal IGA. The output level of the target secondary current command signal IGA is set to be zero level, whereby the energy input operation is stopped and thus the energy input control can be enabled or disabled. Accordingly, at least one of the IGW generation unit 53 and the IGA generation unit 54 may be provided. Note that the main ignition signal IGT is described as a positive logic signal which is active High level, but may be a low logic signal as a Low active signal in which similar effects and advantages can be obtained.

The present disclosure is not limited to the above-described embodiments, but may be applied to various embodiments of an ignition device of an internal combustion engine without departing the spirit of the present disclosure. For example, the present disclosure may be applied to various spark-ignition type internal combustion engines other than a gasoline engine for vehicles. Moreover, the configuration of the ignition coil 2 or the ignition device 10 may be appropriately changed depending on the subject internal combustion engine.

CONCLUSION

The present disclosure provides a small sized and high performance ignition device capable of performing the main ignition operation and an energy input operation with high controllability while avoiding a change in the device configuration and complexity of the system.

One aspect of the present disclosure is an ignition device of an internal combustion engine including: an ignition coil that generates a discharge energy at a secondary coil connected to an ignition plug, the discharge energy being generated in response to a change in a primary current flowing through a primary coil; a main ignition circuit that controls an energization of the primary coil so as to produce a spark discharge at the ignition coil; an energy input circuit that performs an energy input operation for superposing a current having the same polarity to a secondary current flowing through the secondary coil; and a signal generation circuit that generates, based on a main ignition signal that controls the main ignition operation, at least one of an energy input signal controlling the energy input operation and a target secondary current command signal commanding a target secondary current value.

In the above-described ignition device, the signal generation circuit generates, based on the information acquired from the waveform of the main ignition signal, for example, an energy input signal and performs an energy input operation by the energy input circuit after the main ignition operation. Moreover, the target secondary current command signal is generated and the target secondary current value in the energy input operation is controlled. Furthermore, in the case where the operation state of the internal combustion engine changes, since the waveform information of the main ignition signal, for example, the signal period, is changed, the operation state is determined using the change in the signal period, which will be utilized in the energy input operation. Thus, an energy input operation of the energy input circuit is appropriately performed depending on the operation state of the internal combustion engine, or the secondary current during the spark discharging can be appropriately controlled.

According to the above-described ignition device, a signal for energy input operation can be generated only with the main ignition signal in the signal generation circuit, and it is not necessary for changing a device configuration of a transmission side of the main ignition signal from that of a device including no energy input function. Further, since only one signal line is required for transmitting the main ignition signal, an increase in the number of cylinders and an increase in the number of signal terminals and signal lines can be minimized. Therefore, an efficient ignition control can be accomplished while avoiding a complexed system configuration and suppressing an increase in space for mounting the system in the vehicle.

As described, according to the above-described aspects, a small sized and high performance ignition device capable of performing the main ignition operation and an energy input operation with high controllability can be provided while avoiding a change in the device configuration and complexity of the system.

What is claimed is:

1. An ignition device of an internal combustion engine comprising:
   an ignition coil that generates a discharge energy at a secondary coil connected to an ignition plug, the discharge energy being generated in response to a change in a primary current flowing through a primary coil;
   a main ignition circuit that controls an energization of the primary coil so as to produce a spark discharge at the ignition coil;
   an energy input circuit that performs an energy input operation for superposing a current having the same polarity to a secondary current flowing through the secondary coil; and
   a signal generation circuit that generates, based on a main ignition signal that controls the main ignition operation, at least one of an energy input signal controlling the energy input operation and a target secondary current command signal commanding a target secondary current value, wherein
   the signal generation circuit includes an operation region determination unit that determines an operation region of an internal combustion engine; and
   the ignition device determines whether an energy input operation is performed in accordance with a determination result of the operation region determination unit.

2. The ignition device according to claim 1, wherein the signal generation circuit generates both the energy input signal and the target secondary current command signal.

3. The ignition device according to claim 1, wherein the operation region determination unit determines the operation region of the internal combustion engine as a speed region based on a signal period of the main ignition signal.

4. The ignition device according to claim 3, wherein the operation region determination unit determines the speed region based on a result of measuring the signal period starting from an output of the main ignition signal.

5. The ignition device according to claim 1, wherein the signal generation circuit includes at least one of an IGW generation unit and an IGA generation unit,
   the IGW generation unit and the IGA generation unit generating, based on waveform information of the main ignition signal and a determination result of the operation region determination unit, the energy input signal IGW commanding an energy input period and the target secondary current command signal, respectively.

6. The ignition device according to claim 5, wherein the IGW generation unit generates, based on the determination result of the operation region determination unit, the energy input signal commanding one of a plurality of energy input periods.

7. The ignition device according to claim 5, wherein the IGA generation unit generates, based on the determination result of the operation region determination unit, the target secondary current command signal commanding one of a plurality of target secondary current values.

8. The ignition device according to claim 1, wherein the ignition device includes a feedback control unit that performs a feedback control of the secondary current based on the target secondary current command signal.

9. The ignition device according to claim 1, wherein the primary coil includes a main primary coil and a sub primary coil;
   the energy input circuit controls energization of the sub primary coil, thereby controlling the energy input operation.

10. The ignition device according to claim 1, wherein the energy input circuit stops the energy input operation when the target secondary current command signal is zero.

* * * * *